(12) United States Patent
Choi et al.

(10) Patent No.: US 12,322,883 B2
(45) Date of Patent: Jun. 3, 2025

(54) ELECTRONIC DEVICE HAVING ANTENNA

(71) Applicant: LG ELECTRONICS INC., Seoul (KR)

(72) Inventors: Woocheol Choi, Seoul (KR); Ilnam Cho, Seoul (KR); Byungwoon Jung, Seoul (KR); Kukheon Choi, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/720,327

(22) PCT Filed: Dec. 15, 2021

(86) PCT No.: PCT/KR2021/019033
§ 371 (c)(1),
(2) Date: Jun. 14, 2024

(87) PCT Pub. No.: WO2023/113063
PCT Pub. Date: Jun. 22, 2023

(65) Prior Publication Data
US 2024/0421492 A1 Dec. 19, 2024

(51) Int. Cl.
*H01Q 1/22* (2006.01)
*H01Q 1/12* (2006.01)
*H01Q 9/04* (2006.01)
*H01Q 1/52* (2006.01)

(52) U.S. Cl.
CPC ......... *H01Q 9/0485* (2013.01); *H01Q 1/1271* (2013.01); *H01Q 1/22* (2013.01); *H01Q 9/0407* (2013.01); *H01Q 1/52* (2013.01)

(58) Field of Classification Search
CPC .......... H01Q 1/22; H01Q 1/52; H01Q 9/0407; H01Q 21/0025; H01Q 1/38; H01Q 1/243
See application file for complete search history.

(56) References Cited

U.S. PATENT DOCUMENTS

| | | | | |
|---|---|---|---|---|
| 11,119,620 B2* | 9/2021 | Chen | ...................... | G06F 3/0445 |
| 11,462,823 B2* | 10/2022 | Oh | ........................... | H01Q 1/38 |
| 11,955,697 B2* | 4/2024 | Lee | ........................... | H01Q 1/36 |

FOREIGN PATENT DOCUMENTS

| | | |
|---|---|---|
| KR | 10-2015-0104809 A | 9/2015 |
| KR | 10-2016-0080444 A | 7/2016 |
| KR | 10-2020-0098740 A | 8/2020 |
| KR | 10-2021-0127760 A | 10/2021 |
| KR | 10-2021-0151611 A | 12/2021 |

* cited by examiner

*Primary Examiner* — Hasan Islam
(74) *Attorney, Agent, or Firm* — Birch, Stewart, Kolasch & Birch, LLP

(57) ABSTRACT

An antenna module according to an embodiment comprises: a first layer which is arranged on the front surface of a dielectric substrate, and which is composed of a radiator region having a metal mesh grid, and a dummy region having a dummy mesh grid formed of a plurality of patterns; and a second layer which is arranged on the rear surface of the dielectric substrate and which allows the metal mesh grid to operate as a ground. The plurality of patterns can form a first metal line to a fourth metal line, the first metal line and the third metal line can be parallel to each other, the second metal line can connect the first metal line to the third metal line, and the fourth metal line can be connected to a second end portion of the third metal line.

20 Claims, 26 Drawing Sheets

(a)

(b)

(a)

(b)

(a)

(b)

(a)

(b)

(a)

(b)

(a)  L=500um (b)  L=480um (c)  L=460um (d)  L=440um (e)  L=420um (f)  L=400um

ELECTRONIC DEVICE HAVING ANTENNA

CROSS REFERENCE TO RELATED APPLICATIONS

This application is the National Phase of PCT/KR2021/019033 filed on Dec. 15, 2021, which is hereby expressly incorporated by reference into the present application.

TECHNICAL FIELD

The present disclosure relates to an electronic device having antennas. One particular implementation relates to an antenna module realized in a multi-layered circuit board and an electronic device having the same.

BACKGROUND ART

As functions of electronic devices diversify, the electronic devices can be implemented as image display devices such as multimedia players having complex functions, for example, playing music or video files, playing games, receiving broadcasts, and the like.

An image display device is a device for reproducing (playing) image contents. Image display devices receive images (videos) from various sources and reproduce the received images. Image display devices are implemented as various devices such as PCs (Personal Computers), smart phones, tablet PCs, laptop computers, TV sets, and the like. An image display device such as a smart TV may provide an application for providing web contents, such as web browsers.

The electronic device such as the image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi radio interface may be considered as an interface for a communication service between electronic devices. When using such a WiFi radio interface, a millimeter wave (mmWave) band may be used for high-speed data transmission between the electronic devices. In particular, the high-speed data transmission between the electronic devices is achieved using a radio interface such as 802.11ay.

In this regard, an array antenna that can operate in a millimeter wave (mmWave) band may be implemented on a display of an electronic device. Meanwhile, frequency band expansion and communication module design technologies for supporting ultra-high speed and large capacity communication are rapidly evolved together with rapid development of Wi-Fi using 5G mobile communication and mmWave band. An application of such technologies to various industrial groups such as TV, robot, vehicle, terminal, etc. is taken into account. In addition, the demand for development of a thinner and lighter full-screen display to which design factors are reflected is greatly increasing.

To implement high-quality communication services, an application of a communication module that is capable of radiating radio waves in all directions in addition to a side direction of an electronic device is required. However, the design of antenna module and RF front-end using display bezels and adjacent structures has a very narrow space limitation and limits the design factors.

In an electronic device providing a full-screen display, an antenna element may be disposed in a display area. The antenna element disposed in the display area may be implemented to have a transparent antenna structure. Meanwhile, an antenna element designed on a ground plane radiates an electromagnetic wave in a vertical direction, but surface waves flowing along a dielectric region and the ground plane are present. However, there is such a problem that the surface waves may not only cause an interference to peripheral components/elements, but also induce leakage current in adjacent antennas during antenna arrangement, thus resulting in unwanted radiation.

DISCLOSURE OF INVENTION

Technical Problem

The present disclosure is directed to solving the aforementioned problems and other drawbacks. In addition, another aspect of the present disclosure is to provide an electronic device capable of communicating with another device located in a front direction by implementing an antenna element operating in an mmWave band on a display.

Another aspect of the present disclosure is to propose a structure configured to suppress generation of surface waves at an antenna operating frequency.

Another aspect of the present disclosure is to prevent a decrease in antenna efficiency due to surface waves in an antenna configuration disposed on a display.

Another aspect of the present disclosure is to prevent unwanted radiation caused by surface waves in an antenna configuration disposed on a display.

Another aspect of the present disclosure is to prevent interference between adjacent antenna elements due to surface waves in an antenna configuration disposed on a display.

Another aspect of the present disclosure is to optimize antenna performance by designing a high impedance surface optimized for each frequency band in a millimeter wave band.

Solution to Problem

To achieve these and other advantages and in accordance with the purpose of the present disclosure, as embodied and broadly described herein, there is provided an antenna module including: a dielectric substrate; a first layer arranged on a front surface of the dielectric substrate, and including a radiator region having a metal mesh grid and a dummy region having a dummy mesh grid including a plurality of patterns; and a second layer arranged on a rear surface of the dielectric substrate and configured to allow a metal mesh grid to operate as a ground, wherein the plurality of patterns constitute a first metal line to a fourth metal line, the first metal line and the third metal line are lines parallel to each other, the second metal line connects the first metal line to the third metal line, and the fourth metal line is connected to a second end portion of the third metal.

In an embodiment, side surface radiation at the first layer may be prevented by a capacitive component between the plurality of patterns of the dummy mesh grid on the first layer and the metal mesh grid on the second layer and an inductive component of the metal mesh grid on the second layer.

In an embodiment, a first end portion and a second end portion of the first metal line may be configured to be disconnected from adjacent metal lines, a first end portion of the second metal line may be connected to the first metal line, and a second end portion of the second metal line may be disconnected from an adjacent metal line, a first end portion and a second end portion of the third metal line may be connected to the second metal line and the fourth metal line, respectively, and a first end portion and a second end portion of the fourth metal line may be configured to be disconnected from adjacent metal lines.

In an embodiment, the first metal line and the third metal line may constitute a first inductive component, a first capacitive component may be constituted between adjacent metal lines at a center point of the second metal line and a center point of the fourth metal line, respectively, and the second end portion of the second metal line and the second end portion of the fourth metal line respectively may constitute a second capacitive component between adjacent metal lines.

In an embodiment, the plurality of patterns may include a first unit cell including the first metal line to the fourth metal line; and a second unit cell configured to include a fifth metal line to an eighth metal line, and the fifth metal line and the seventh metal line may be lines parallel to each other, the sixth metal line may connect the fifth metal line to the seventh metal line, and the eighth metal line may be connected to a second end portion of the seventh metal line.

In an embodiment, a first end portion of the fifth metal line may be configured to be disconnected from the fourth metal line, and a second end portion of the fifth metal line may be configured to be disconnected from an adjacent metal line, a first end portion of the sixth metal line may be connected to the fifth metal line, and a second end portion of the sixth metal line may be disconnected from an adjacent metal line, a first end portion and a second end portion of the seventh metal line may be connected to the sixth metal line and the eighth metal line, respectively, and a first end portion of the eighth metal line may be configured to be disconnected from the third metal line, and a second end portion of the eighth metal line may be configured to be disconnected from an adjacent metal line.

In an embodiment, the second end portion of the first metal line may be configured to be disconnected from the eighth metal line to constitute a first capacitive component, and the first end portion of the fourth metal line may be configured to be disconnected from the seventh metal line to constitute a first capacitive component.

In an embodiment, the fifth metal line and the seventh metal line may constitute a first inductive component, a first capacitive component may be constituted between adjacent metal lines at a center point of the sixth metal line and a center point of the eighth metal line, and the second end portion of the sixth metal line and the second end portion of the eighth metal line may constitute a second capacitive component between adjacent metal lines, respectively.

In an embodiment, the dielectric substrate may be configured as a transparent substrate disposed on a surface of or inside a display of an electronic device or on a surface of or inside glass of a vehicle.

In an embodiment, the metal mesh grid in the radiator region may be configured such that metal lines are interconnected to each other so that current is generated through the radiator region via the metal lines and a wireless signal is radiated by the current generated through the radiator region.

In an embodiment, a first unit cell of the dummy mesh grid including the plurality of patterns in the dummy region may be configured such that a first end portion and a second end portion of the first metal line, a second end portion of the second metal line, and a second end portion of the fourth metal line may be disconnected from adjacent metal lines. Thus, side surface radiation at the first layer may be prevented.

In an embodiment, the second unit cell of the dummy mesh grid including the plurality of patterns in the dummy region may be configured such that a first end portion and a second end portion of the fifth metal line, a second end portion of the sixth metal line, and a second end portion of the eighth metal line are disconnected from adjacent metal lines. Thus, side surface radiation at the first layer may be prevented.

In an embodiment, the second layer may be configured such that metal lines constituting a ground mesh grid are interconnected to each other to constitute a second inductive component corresponding to a current path induced in the ground mesh grid, and a third capacitive component may be constituted between the dummy mesh grid on the first layer and the ground mesh grid.

In an embodiment, the dummy mesh grid may constitute an open dummy structure in which a metal line is disconnected from an adjacent metal line, and a pitch between the first to eighth metal lines in the open dummy structure may be set to be in a range of 60 to 300 um.

In an embodiment the antenna module may further include a flexible printed circuit board (FPCB) coupled to a feed pattern in the antenna region and having a ground pattern disposed on both sides of a feed line located on one surface and spaced apart from the feed line. The radiator region may include: an antenna element including a metal mesh grid in which metal lines are interconnected to each other in one axis direction and another axis direction to radiate a wireless signal; and the feed pattern including a metal mesh grid in which metal lines are interconnected to each other at least in one axis direction to feed a wireless signal to the antenna element. A first end portion of the first metal line and a first end portion of the fourth metal line in the dummy region may be configured to be disconnected from end portions of metal lines extending from outer metal lines in the antenna element.

In an embodiment, shape, a shape, a thickness in a height direction, and a line width of a first metal mesh pattern on the first layer may be configured to correspond to a shape, a thickness in a height direction, and a line width of a second metal mesh pattern on the second layer. A first point of intersection or disconnection of the first metal mesh pattern in one axial direction and another axial direction may be configured to correspond to a second point of intersection of the second metal mesh pattern.

According to another aspect of the present disclosure, an electronic device having an antenna module may include: a display configured to output information to a screen and having a metal mesh pattern configured to radiate wireless signals to adjacent electronic devices; and an antenna module disposed in a lower region of the electronic device. The antenna module may include: a dielectric substrate disposed in a lower region of the display; a first layer arranged on a front surface of the dielectric substrate, and including a radiator region having a metal mesh grid and a dummy region having a dummy mesh grid including a plurality of patterns; and a second layer arranged on a rear surface of the dielectric substrate and configured to allow a metal mesh grid to operate as a ground.

In an embodiment, the plurality of patterns may constitute a first metal line to a fourth metal line, the first metal line and the third metal line may be lines parallel to each other, the second metal line may connect the first metal line to the third metal line, and the fourth metal line may be connected to a second end portion of the third metal.

In an embodiment, side surface radiation at the first layer may be prevented by a capacitive component between the plurality of patterns of the dummy mesh grid on the first layer and the metal mesh grid on the second layer and an inductive component of the metal mesh grid of the second layer.

In an embodiment, a first end portion and a second end portion of the first metal line may be configured to be disconnected from adjacent metal lines, a first end portion of the second metal line may be connected to the first metal line, and a second end portion of the second metal line is disconnected from an adjacent metal line, and a first end portion and a second end portion of the third metal line may be connected to the second metal line and the fourth metal line, respectively, and a first end portion and a second end portion of the fourth metal line may be disconnected from adjacent metal lines.

In an embodiment, the plurality of patterns may include a first unit cell including the first metal line to the fourth metal line; and a second unit cell configured to include a fifth metal line to an eighth metal line. The fifth metal line and the seventh metal line may be lines parallel to each other, the sixth metal line may connect the fifth metal line to the seventh metal line, and the eighth metal line may be connected to a second end portion of the seventh metal line.

In an embodiment, a first end portion of the fifth metal line may be configured to be disconnected from the fourth metal line, and a second end portion of the fifth metal line may be configured to be disconnected from an adjacent metal line, a first end portion of the sixth metal line may be connected to the fifth metal line, and a second end portion of the sixth metal line may be disconnected from an adjacent metal line, a first end portion and a second end portion of the seventh metal line may be connected to the sixth metal line and the eighth metal line, respectively, and a first end portion of the eighth metal line may be configured to be disconnected from the third metal line, and a second end portion of the eighth metal line is configured to be disconnected from an adjacent metal line.

In an embodiment, the electronic device may include: a transceiver circuit electrically connected to the antenna module and configured to apply a first signal and a second signal to an antenna pattern through a feed pattern and a second feed pattern; and a processor operably coupled to the transceiver circuit to control the transceiver circuit.

In an embodiment, the processor may control the transceiver circuit to perform first beamforming by a first signal and second beamforming by a second signal while performing multiple input/multiple output (MIMO), in response to the first signal and the second signal being applied to array antennas disposed in a plurality of antenna elements.

Advantageous Effects of Invention

Hereinafter, technical effects of the antenna module disposed in the display operating in the millimeter wave (mmwave) band and the electronic device including the configuration for controlling the same will be described.

According to an embodiment, generation of surface waves at an antenna operating frequency may be suppressed by placing a dummy lattice structure having a unit cell structure in a dielectric region.

According to an embodiment, an end portion of a metal line in a unit cell structure may be disconnected from an adjacent metal line and a metal mesh line of an antenna element to prevent a decrease in antenna efficiency due to a surface wave.

According to an embodiment, an end portion of a metal line in a unit cell structure is disconnected from an adjacent metal line and a metal mesh line of an antenna element to prevent unwanted radiation due to a surface wave in an antenna configuration disposed on a display.

According to an embodiment, a dummy lattice structure having a unit cell structure may be disposed in a dielectric region between antenna elements to prevent interference between adjacent antenna elements due to a surface wave.

According to an embodiment, antenna performance may be optimized by designing a high impedance surface (HIS) optimized for each frequency band in a millimeter wave band, by adjusting pitch spacing of a dummy lattice structure.

According to an embodiment, radiation efficiency and an antenna gain may be greatly increased by concentrating current on an antenna to which a HIS is applied to completely radiate applied power into air.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
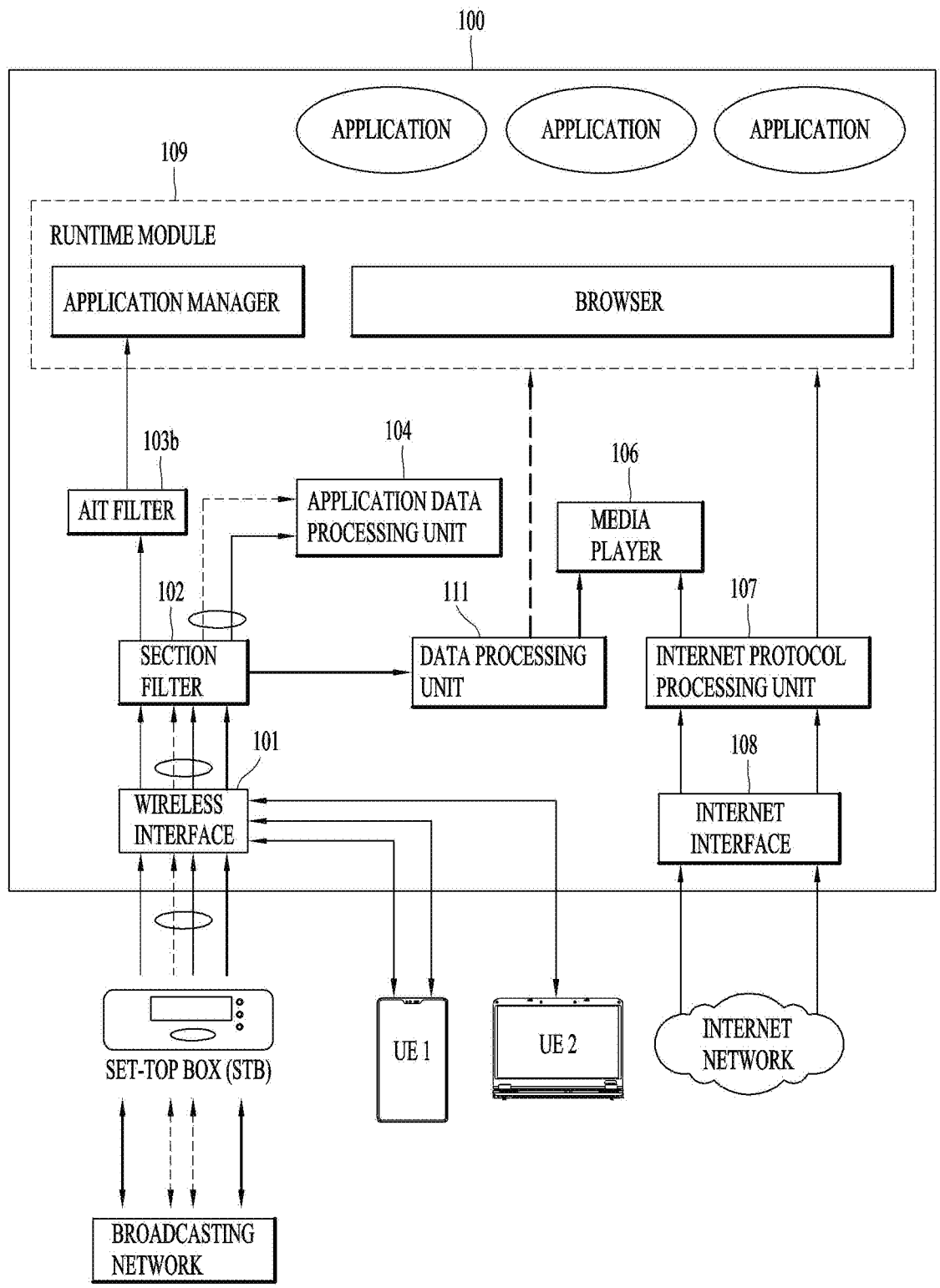
FIG. 1 is a diagram schematically illustrating an example of an entire wireless audiovisual (AV) system including an image display device according to one embodiment of the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the disclosure pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

FIG. 1 is a diagram schematically illustrating an example of an entire wireless AV system including an image display device according to one embodiment of the present disclosure.

As illustrated in FIG. 1, an image display device 100 according to one embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface.

In relation to this, the image display device 100 may be configured to be connected to a server or another electronic device via a wireless communication system. As an example, the image display device 100 needs to provide an 802.111ay communication service operating in a millimeter wave (mmWave) band to transmit or receive large-capacity data at a high speed.

The mmWave band may be any frequency band in a range of 10 GHz to 300 GHz. In this disclosure, the mmWave band may include an 802.11ay band of a 60 GHz band. In addition, the mmWave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

The image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device 100.

The image display device 100 includes, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Through a broadcast interface that is the wireless interface 101*b*, AIT data, real-time broadcast content, application data, and a stream event are received. The real-time broadcast content may be referred to as linear audio/video (A/V) content.

The section filter 102*b* performs section filtering on four types of data received through the wireless interface 101*b* to transmit the AIT data to the AIT filter 103*b*, the linear A/V content to the data processing unit 111*b*, and the stream events and the application data to the application data processing unit 104*b*.

Non-linear A/V content and the application data are received through the Internet interface 108*b*. The non-linear A/content may be, for example, a content on demand (COD) application. The non-linear A/V content is transmitted to the media player 106*b*, and the application data is transmitted to the runtime module 109*b*.

Further, the runtime module 109*b* includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device will be described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting an 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, it may be configured to provide a coverage of 10 meters or longer in an indoor environment, and 100 meters or longer in an outdoor environment with a line of sight (LOS) channel condition.

The electronic device supporting the 802.11ay wireless interface may be configured to provide visual reality (VR) headset connectivity, support server backups, and support cloud applications that require low latency.

An ultra-short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, the 8K UHD Wireless Transfer at Smart Home Usage Model may be taken into account. In the Smart Home Usage Model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in an mmWave band and an electronic device including the array antenna will be described with reference to the accompanying drawings. It will be apparent to those skilled in the art that the present disclosure may be embodied in other specific forms without departing from the spirit or essential characteristics thereof.

Figure 2:
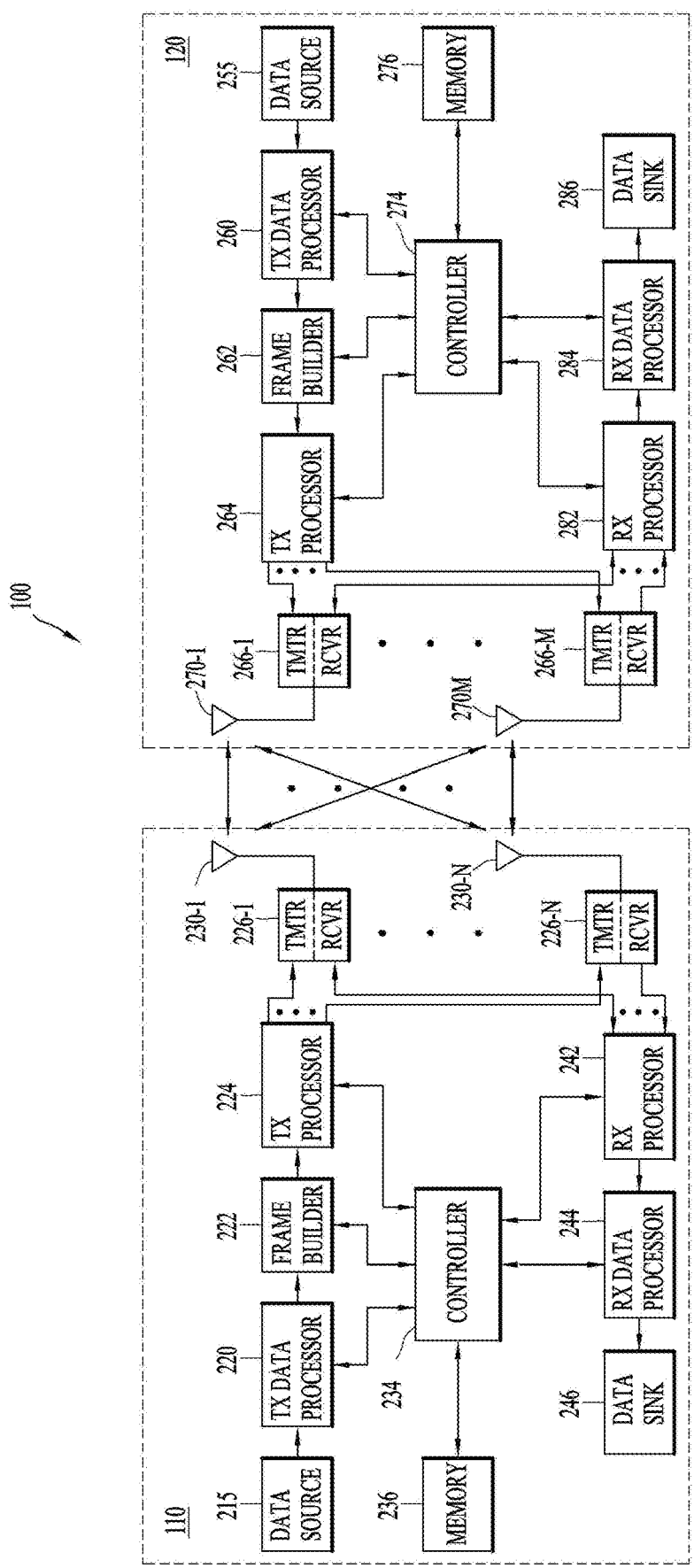
FIG. 2 illustrates a detailed configuration of electronic devices configured to support wireless interfaces according to the present disclosure.

FIG. 2 illustrates a detailed configuration of electronic devices configured to support wireless interfaces according to the present disclosure. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

During operation, the TX data processor 220 receives data (e.g., data bits) from a data source 215, and processes the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16QAM, 64QAM, 64APSK, 128APSK, 256QAM, and 256APSK.

The controller 234 may transmit, to the TX data processor 220, a command for specifying an MCS to be used (e.g., based on channel conditions for downlink transmission). The TX data processor 220 may encode and modulate the data received from the data source 215 according to the specified MCS. It needs to be recognized that the TX data processor 220 may perform additional processing on the data, such as data scrambling and/or other processing. The TX data processor 220 outputs the data symbols to the frame builder 222.

The frame builder 222 constructs a frame (also referred to as a packet) and inserts the data symbols into a data payload of the frame. The frame may include a preamble, a header, and a data payload. The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, the transceiver 266 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna configured to operate with vertical polarization may be vertically arranged inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE) sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit substrate. To do so, among the antennas 230-1 to 230-M, an antenna configured to operate with vertical polarization may be vertically arranged inside the multi-layer circuit substrate.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
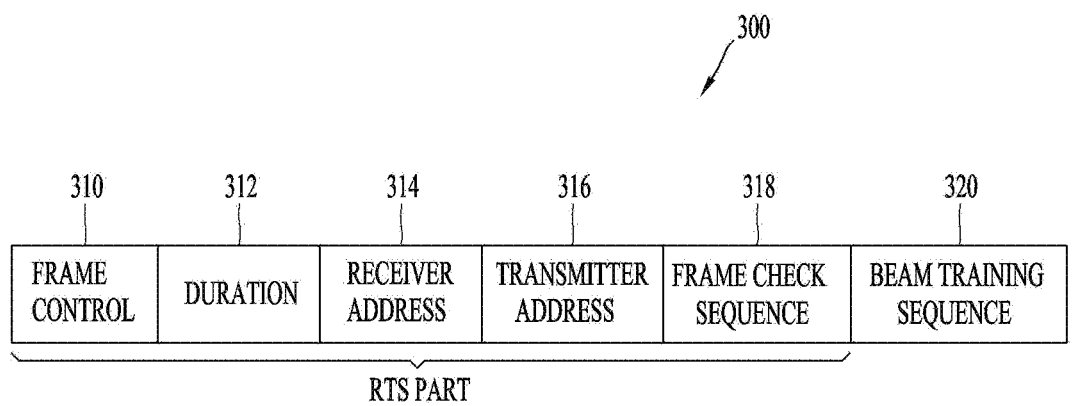
FIG. 3A illustrates a request to send (RTS) and a clear to send (CTS) according to the present disclosure.

Meanwhile, an electronic device supporting 802.11ay wireless interface according to the present disclosure determines whether or not a communication medium is available to communicate with other electronic devices. To this end, the electronic device transmits a Request to Send (RTS)-TRN frame including an RTS part and a first beam training sequence. In this regard, FIG. 3A illustrates a Request to Send (RTS) and a Clear to Send (CTS) according to the present disclosure. A transmitting device may use an RTS frame to determine whether a communication medium is available to transmit one or more data frames to a destination device. In response to the reception of the RTS frame, the destination device transmits a CTS frame to the transmitting device when the communication medium is available. In response to the reception of the CTS frame, the transmitting device transmits the one or more data frames to the destination device. In response to the successful reception of the one or more data frames, the destination device transmits one or more acknowledgment ("ACK") frames to the transmitting device.

Referring to (a) of FIG. 3A, a frame 300 includes an RTS part including a frame control field 310, a duration field 312, a receiver address field 314, a transmitter address field 316, and a frame check sequence field 318. For the purpose of improved communication and interference reduction, the frame 300 further includes a beam training sequence field 320 to configure antennas of a destination device and one or more neighboring devices, respectively.

Referring to (b) of FIG. 3A, a CTS frame 350 includes a CTS part including a frame control field 360, a duration field 362, a receiver address field 364, and a frame check sequence field 366. For the purpose of improved communication and interference reduction, the frame 350 further includes a beam training sequence field 368 to configure antennas of a transmitting device and one or more neighboring devices, respectively.

The beam training sequence fields 320 and 368 may comply with the training (TRN) sequence in accordance with IEEE 802.11ad or 802.11ay. The transmitting device may use the beam training sequence field 368 to configure its antenna for directional transmission to the destination device. On the other hand, the transmitting devices may use the beam training sequence field to configure their own antennas to reduce transmission interference at the destination device. In this case, the transmitting devices may use the beam training sequence field to configure their own antennas to generate antenna radiation patterns with nulls aimed at the destination device.

Therefore, electronic devices supporting 802.11ay wireless interface may form initial beams to have a low interference level therebetween using beamforming patterns determined according to the beam training sequence. In this regard, FIG. 3B is a block diagram illustrating a communication system 400 according to an example of the present disclosure. As illustrated in FIG. 3B, first and second devices 410 and 420 may improve communication performance by matching directions of main beams. On the other hand, the first and second devices 410 and 420 may form signal-null having weak signal intensity in a specific direction, in order to reduce interference with a third device 430.

In relation to the formation of the main beam and the signal-null, a plurality of electronic devices according to the present disclosure may perform beamforming through array antennas. Referring to FIG. 3B, some of the plurality of electronic devices may alternatively be configured to perform communication with an array antenna of another electronic device through a single antenna. In this regard, when performing communication through the single antenna, a beam pattern is formed as an omnidirectional pattern.

Referring to FIG. 3B, the first to third devices 410 to 430 perform beamforming but a fourth device 440 does not perform beamforming, but the present disclosure is not limited thereto. Therefore, it may alternatively be configured such that three of the first to fourth devices 410 to 440 perform beamforming and the other may not perform beamforming.

As another example, it may be configured such that any one of the first to fourth devices 410 to 440 performs beamforming and the remaining three devices do not perform beamforming. As still another example, it may be configured such that two of the first to fourth devices 410 to 440 perform beamforming and the remaining two devices do not perform beamforming. As still another example, all the first to fourth devices 410 to 440 may be configured to perform beamforming.

Referring to FIGS. 3A and 3B, the first device 410 determines that it is an intended receiving device of the CTS-TRN frame 350 on the basis of an address displayed on the receiver address field 364 of the CTS-TRN frame 350. In response to the determination as the intended receiving device of the CTS-TRN frame 350, the first device 410 may use the beam training sequence of the beam training sequence field 368 of the received CTS-TRN 350 to configure its own antenna for a directional transmission substantially and selectively aimed at the second device 420. That is, the antenna of the first device 410 is configured to generate a primary lobe (e.g., highest gain lobe) substantially aimed at the second device 420, and an antenna radiation pattern with non-primary lobes aimed at other directions.

The second device 420 already knows the direction toward the first device 410 based on the beam training sequence of the beam training sequence field 320 of the previously-received RTS-TRN frame 300. Therefore, the second device 420 may configure its own antenna for a directional reception (e.g., primary antenna radiation lobe) selectively aimed at the first device 410. Therefore, while the antenna of the first device 410 is configured for the directional transmission toward the second device 420 and the antenna of the second device 420 is configured for the directional reception from the first device 410, the first device 410 transmits one or more data frames to the second device 420. Accordingly, the first and second devices 410 and 420 perform directional transmission/reception (DIR-TX/RX) of the one or more data frames through the primary lobe (main beam).

On the other hand, the first and second devices 410 and 420 may partially modify the beam pattern of the third device 430 to reduce interference with the third device 430 due to an antenna radiation pattern with the non-primary lobes.

In this regard, the third device 430 determines that it is not an intended receiving device of the CTS-TRN frame 350 on the basis of an address indicated in the receiver address field 364 of the CTS-TRN frame 350. In response to the determination that it is not the intended receiving device of the CTS-TRN frame 350, the third device 430 uses the beam training sequence of the beam training sequence field 368 of the received CTS-TRN 350 and the sequence of the beam training sequence field 320 of the previously-received RTS-TRN frame 300, in order to configure its antenna to generate antenna radiation patterns each with nulls substantially aimed at the second device 420 and the first device 410. The nulls may be based on estimated arrival angles of the previously-received TRS-TRN frame 300 and CTS-TRN frame 350. In general, the third device 430 generates antenna radiation patterns with desired signal power, refusals, or gains aimed at the first device 410 and the second device 420 such that estimated interferences at the devices 410 and 420 are equal to or lower than a defined threshold value (e.g., to achieve a desired bit error rate (BER), signal-to-noise ratio (SNR), signal-to-interference ratio (SINR), and/or other one or more communication attributes).

The third device 430 may configure its antenna transmission radiation pattern by estimating antenna gains in directions toward the first and second devices 410 and 420, estimating antenna mutuality differences (e.g., transmitting antenna gain-receiving antenna gain) between the third device 430 and the first and second devices 410 and 420, and calculating those values over one or more sectors for determining corresponding estimated interferences at the first and second devices 410 and 420.

The third device 430 transmits the RTS-TRN frame 300 intended for the fourth device 440, which the fourth device 440 receives. The third device 430 maintains an antenna configuration with nulls aimed at the first and second devices 410 and 420 as long as the first device 410 and the second device 420 are communicating based on durations displayed on the duration fields 312 and 362 of the RTS-TRN frame 300 and the CTS-TRN frame 350, respectively. As the antenna of the third device 430 is configured to produce the nulls aimed at the first device 410 and the second device 420, the transmission of the RTS-TRN frame 300 by the third device 430 may produce reduced interferences at the first device 410 and the second device 420.

Therefore, electronic devices supporting the 802.11ay wireless interface disclosed herein can form a signal-null to a specific direction for interference reduction while matching a main beam direction therebetween using array antennas. To this end, the plurality of electronic devices may form an initial beam direction through a beam training sequence, and change the beam direction through the periodically updated beam training sequence.

As aforementioned, the beam directions should be matched between the electronic devices for high-speed data communication between the electronic devices. Also, the loss of wireless signals transmitted to an antenna element should be minimized for the high-speed data communication. To this end, the array antenna should be disposed inside a multi-layered substrate on which an RFIC is disposed. Also, the array antenna is necessarily disposed adjacent to a side area inside the multi-layered substrate for radiation efficiency.

In addition, the beam training sequence should be updated to adapt to the change of a wireless environment. To update the beam training sequence, the RFIC should periodically transmit and receive signals to and from a processor such as a modem. Therefore, control signal transmission and reception between the RFIC and the modem should also be carried out within fast time to minimize an update delay time. To this end, a physical length of a connection path between the RFIC and the modem should be reduced. To this end, the modem may be disposed on the multi-layered substrate on which the array antenna and the RFIC are disposed. Or, in the structure that the array antenna and the RFIC are disposed on the multi-layered substrate and the modem is disposed on a main substrate, the connection length between the RFIC and the modem may be minimized. A detailed structure thereof will be described later with reference to FIG. 5C.

Figure 4:
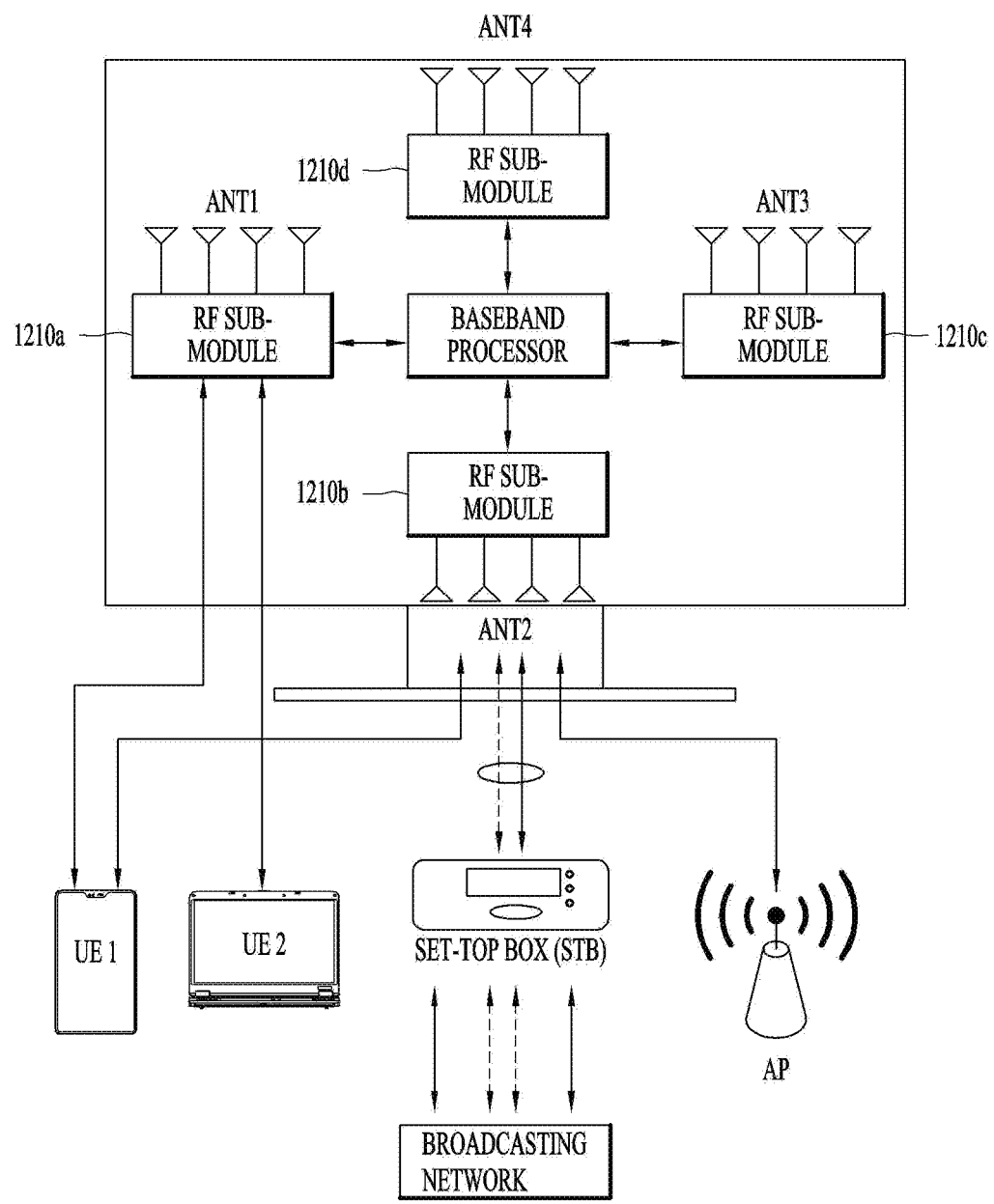
FIG. 4 is a diagram illustrating an electronic device including a plurality of antenna modules and a plurality of transceiver circuit modules in accordance with one embodiment.

Hereinafter, an electronic device having an array antenna that can operate in an mmWave band will be described. In this regard, FIG. 4 is a diagram illustrating an electronic device including a plurality of antenna modules and a plurality of transceiver circuit modules in accordance with one embodiment. Referring to FIG. 4, a home appliance in which a plurality of antenna modules and a plurality of transceiver circuit modules are disposed may be a television, but is not limited thereto. Therefore, the home appliance having the plurality of antenna modules and the plurality of transceiver circuit modules disclosed herein may include an arbitrary home appliance or display device that supports a communication service in a millimeter wave band.

Referring to FIG. 4, the electronic device 1000 includes a plurality of antenna modules ANT1 to ANT4 and a plurality of transceiver circuit modules 1210a to 1210d. In this regard, the plurality of transceiver circuit modules 1210a to 1210d may correspond to the aforementioned transceiver circuit 1250. Or, the plurality of transceiver circuit modules 1210a to 1210d may be a partial configuration of the transceiver circuit 1250 or a partial configuration of a front end module constituted between the antenna module and the transceiver circuit 1250.

The plurality of antenna modules ANT1 to ANT4 may be configured as array antennas with a plurality of antenna elements. The number of elements of each antenna module ANT1 to ANT4 may be two, three, four, and the like as aforementioned, but it not limited thereto. For example, the number of antenna modules ANT1 to ANT4 may be expanded to two, four, eight, sixteen, and the like. Also, the elements of the antenna modules ANT1 to ANT4 may be selected by the same number or different numbers. The plurality of antenna modules ANT1 to ANT4 may be disposed on different areas of the display or on a bottom or side surface of the electronic device. The plurality of antenna modules ANT1 to ANT4 may be disposed on top, left, bottom, and right sides of the display, but the present disclosure is not limited thereto. As another example, the plurality of antenna modules ANT1 to ANT4 may alternatively be disposed on a left top portion, a right top portion, a left bottom portion, and a right bottom portion of the display.

The antenna modules ANT1 to ANT4 may be configured to transmit and receive signals at an arbitrary frequency band in a specific direction. For example, the antenna modules ANT1 to ANT4 may operate at one of 28 GHz band, 39 GHz band, and 64 GHz band.

The electronic device may maintain a connection state with different entities through two or more of the antenna modules ANT1 to ANT4 or perform data transmission or reception therefor. In this regard, the electronic device corresponding to the display device may transmit or receive data to or from a first entity through the first antenna module ANT1. The electronic device may transmit or receive data to or from a second entity through the second antenna module ANT2. As one example, the electronic device may transmit or receive data to or from a mobile terminal (User Equipment (UE)) through the first antenna module ANT1. The electronic device may transmit or receive data to or from a control device such as a set-top box or access point (AP) through the second antenna module ANT2.

The electronic device may transmit or receive data to or from other entities through the other antenna modules, for example, the third antenna module ANT3 and the fourth antenna module ANT4. As another example, the electronic device may perform dual connectivity or MIMO with at least one of previously-connected first and second entities through the third antenna module ANT3 and the fourth antenna module ANT4.

The mobile terminals UE1 and UE2 may be disposed on a front area of the electronic device to communicate with the first antenna module ANT1. On the other hand, the set-top box STB or the AP may be disposed on a bottom area of the electronic device to communicate with the second antenna module ANT2 but is not limited thereto. As another example, the second antenna module ANT2 may include a first antenna radiating a signal to the bottom area, and a second antenna radiating a signal to a front area. Therefore, the second antenna module ANT2 may perform communication with the set-top box STB or the AP through the first antenna, and perform communication with one of the mobile terminals UE1 and UE2 through the second antenna.

Meanwhile, one of the mobile terminals UE1 and UE2 may be configured to perform MIMO with the electronic device. As one example, the UE1 may be configured to perform MIMO while performing beamforming with the electronic device. As aforementioned, the electronic device corresponding to the image display device may perform high-speed communication with another electronic device or set-top box through a WiFi wireless interface. As one example, the electronic device may perform high-speed communication with another electronic device or set-top box at 60 GHz through 802.11ay wireless interface.

In the meantime, the transceiver circuit modules 1210a to 1210d may operate to process transmission signals and reception signals at RF frequency bands. Here, the RF frequency bands, as aforementioned, may be arbitrary mmWave frequency bands, such as 28 GHz, 39 GHz, and 64 GHz. The transceiver circuit modules 1210a to 1210d may be referred to as RF sub-modules 1210a to 1210d. At this time, the number of RF sub-modules 1210a to 1210d may not be limited to four, but may vary to an arbitrary number more than two depending on an application.

Also, the RF sub-modules 1210a to 1210d may include an up-conversion module and a down-conversion module that convert a signal of an RF frequency band into a signal of an IF frequency band or a signal of an IF frequency band into a signal of an RF frequency band. To this end, the up-conversion module and the down-conversion module may include a local oscillator (LO) that can perform up-frequency conversion and down-frequency conversion.

The plurality of RF sub-modules 1210a to 1210d may be configured such that a signal is transmitted from one of the plurality of transceiver circuit modules to an adjacent transceiver circuit module. Accordingly, the transmitted signal can be transmitted at least one time to all of the plurality of transceiver circuit modules 1210a to 1210d.

To this end, a data transfer path in a loop structure may be additionally provided. In this regard, the adjacent RF sub-modules 1210b and 1210c may be allowed to perform a bi-directional signal transfer through a transfer path P2 with the loop structure.

Or, a data transfer path in a feedback structure may be additionally provided. In this regard, at least one RF sub-module 1210c is allowed to perform a uni-directional signal transfer to the other RF sub-modules 1210a, 1210b, and 1210c through the data transfer path with the feedback structure.

The plurality of RF sub-modules may include a first RF sub-module to a fourth RF sub-module 1210a to 1210d. In this regard, a signal may be transferred from the first RF sub-module 1210a to the adjacent second RF sub-module 1210B and fourth RF sub-module 1210d. Also, the second RF sub-module 1210b and the fourth RF sub-module 1210d may transfer the signal to the third RF sub-module 1210c. At this time, when the second RF sub-module 1210b and the third RF sub-module 1210c are available to transmit signals bidirectionally, it may be referred to as the loop structure. On the other hand, when the second RF sub-module 1210b and the third RF sub-module 1210c are available to merely transmit signals unidirectionally, it may be referred to as the feedback structure. In the feedback structure, at least two signals may be transferred to the third RF sub-module 1210c.

However, with no limit to this, the baseband module may be disposed in a specific module of the first to fourth RF sub-modules 1210a to 1210d depending on applications. Or, depending on applications, the baseband module may not be disposed in the first to fourth RF sub-modules 1210a to 1210d, but may be configured as a separate controller, namely, a baseband processor 1400. For example, a control signal transfer may alternatively be carried out only by the separate controller, namely, the baseband processor 1400.

Figure 3A:
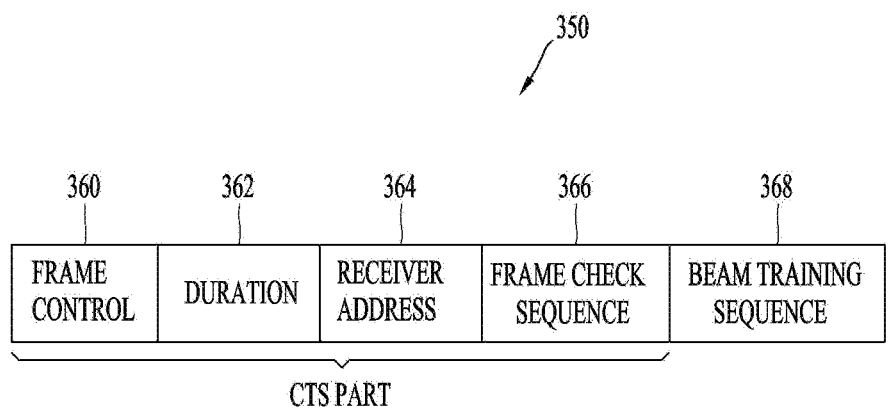
Figure 3B:
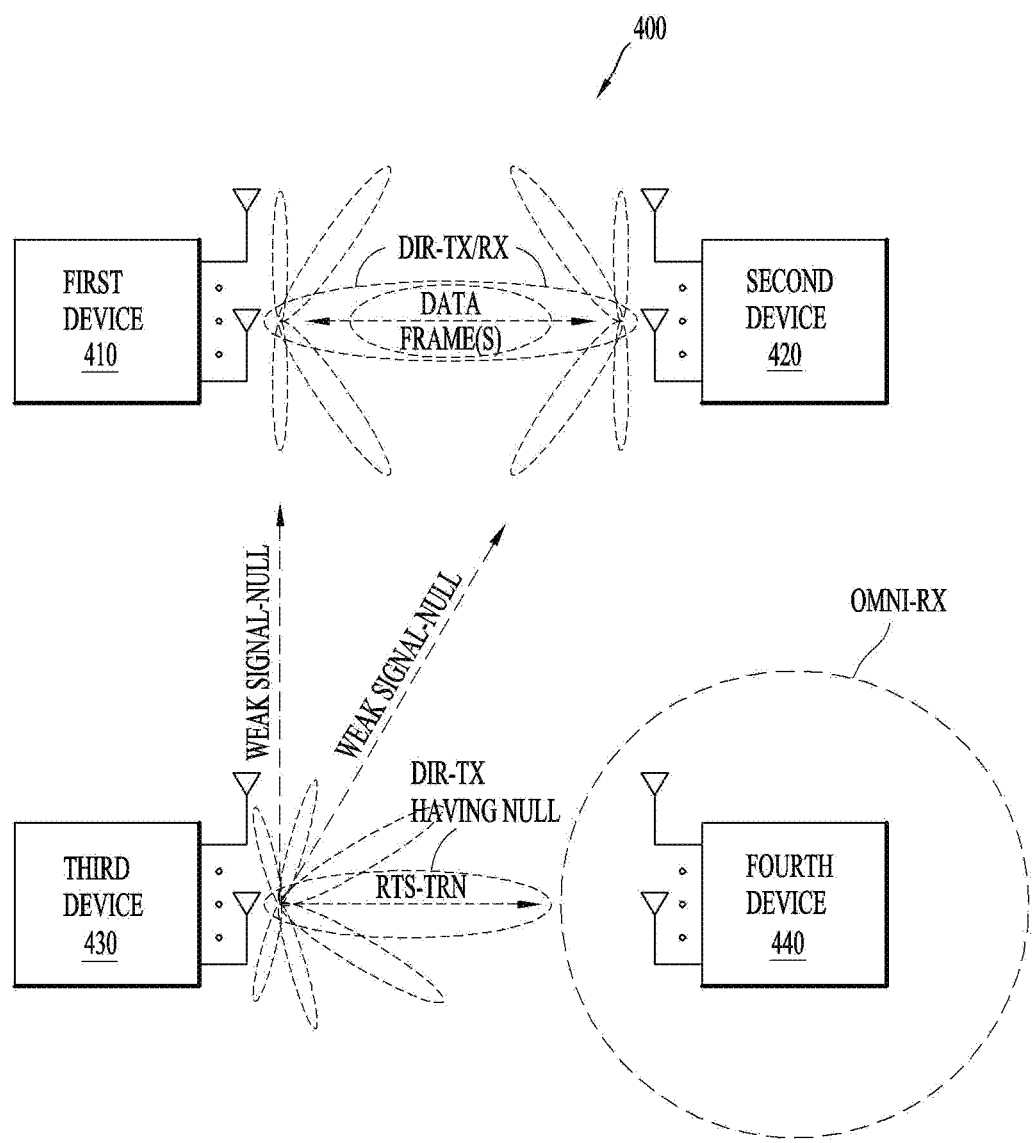
FIG. 3B is a block diagram illustrating a communication system 400 according to an example of the present disclosure.

Hereinafter, a description will be given of detailed configuration and functions of the electronic device having antennas that may be disposed inside or on side surfaces of the multi-transceiver system as illustrated in FIG. 3 and the electronic device of FIG. 4, in the electronic device as illustrated in FIGS. 1 to 2.

The electronic device such as the image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi radio interface may be considered as an interface for a communication service between electronic devices. When using such a WiFi radio interface, a millimeter wave (mmWave) band may be used for high-speed data transmission between the electronic devices. In particular, the high-speed data transmission between the electronic devices is achieved using a radio interface such as 802.11ay.

Hereinafter, a description will be given of detailed configuration and functions of the electronic device as illustrated in FIG. 1, having wireless interfaces as illustrated in FIG. 2. Electronic devices are needed to transmit or receive data therebetween using communication services at an mmWAve band. In this regard, wireless audio-video (AV) service and/or high-speed data transmission may be provided by using 802.11ay wireless interface as the mmWave wireless interface. In this case, the mmWAve wireless interface is not limited to the 802.11ay wireless interface, but an arbitrary wireless interface of 60 GHz may be applied. In this regard, a 5G or 6G wireless interface that uses 28 GHz band or 60 GHz band may alternatively be used for high-speed data transmission between electronic devices.

There is no detailed solution to antenna and radio frequency integrated chip (RFIC) providing a wireless interface in an electronic device such as an image display device for transferring images with resolution over 4K. Specifically, considering a situation that the electronic device such as the image display device is disposed on a wall of a building or a table, the electronic device is needed to transmit or receive wireless AV data to or from another electronic device. To this end, a detailed configuration and antenna structure for determining an area of the image display device to dispose the antenna and RFIC should be proposed.

Figure 5A:
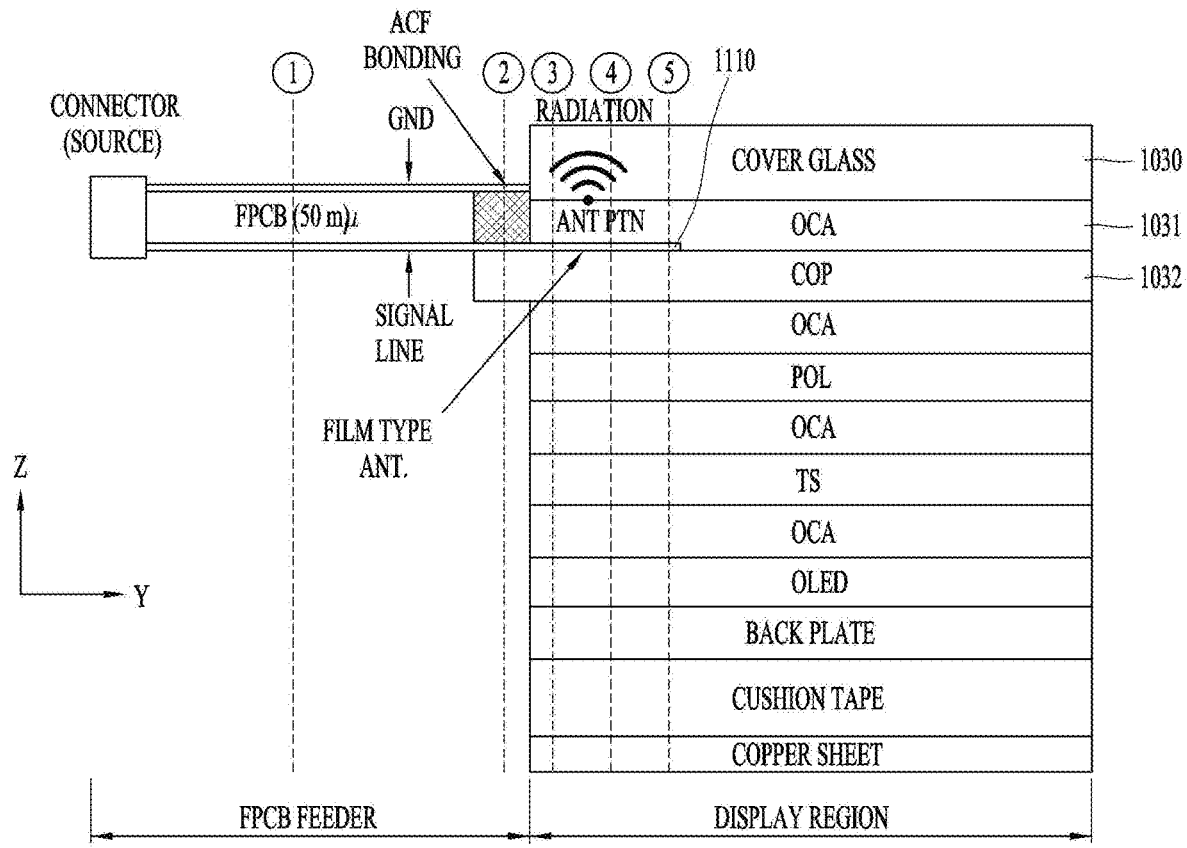
FIG. 5A is a configuration view illustrating that an in-display antenna is connected to a flexible circuit board (FPCB) in accordance with one embodiment. Also.
Figure 5B:
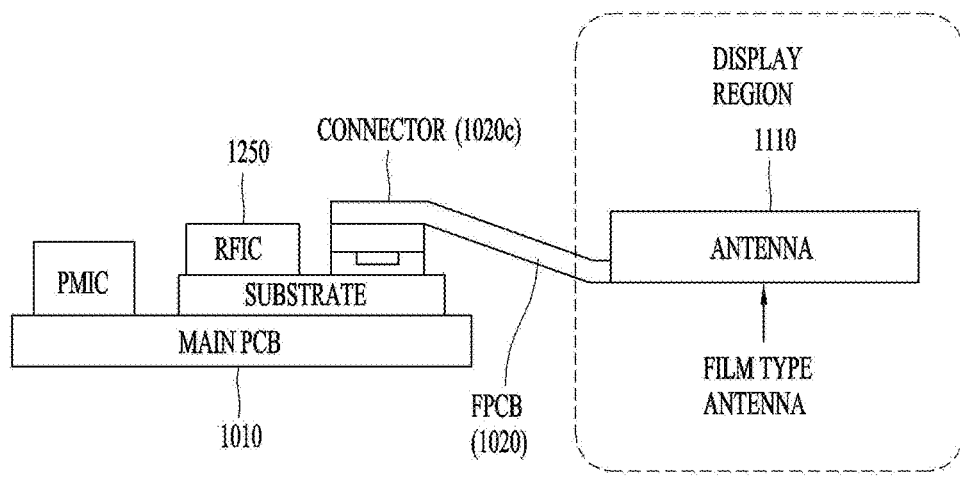
FIG. 5B is a configuration view illustrating that the FPCB connected to the in-display antenna is connected to a main PCB in accordance with one embodiment.

In this regard, FIG. 5A is a configuration view illustrating that an in-display antenna is connected to an FPCB in accordance with one embodiment. Also, FIG. 5B is a configuration view illustrating that the FPCB connected to the in-display antenna is connected to a main PCB in accordance with one embodiment.

Referring to FIG. 5A, an in-display antenna 1110 may be formed as a thin film between an optically clear adhesive (OCA) layer and a cyclo olefine polymer (COP) layer disposed beneath a cover glass of the display 151. Meanwhile, a copper sheet on a lower end of the display 151 is a copper on a lower end of an OLED panel and may operate as a ground plane of the in-display antenna 1110.

Hereinafter, a display structure having transparent antennas therein will be described. Referring to FIG. 5A, a COP layer may be disposed on an OLED display panel and an OCA inside the display. Here, a dielectric in the form of a film, such as the COP layer, may be used as a dielectric substrate of a transparent antenna module. In addition, an antenna layer may be disposed on the dielectric in the form of the film. Here, the antenna layer may be made of alloy (Ag alloy), copper, aluminum, or the like. In some examples, the in-display antenna 1110 and a transmission line may be disposed on the antenna layer.

In relation to the in-display antenna 1110 according to one embodiment, a metal pattern of a feeder may be bonded to a coplanar waveguide (CPW) feeder 1121 through an anisotropic conductive film (ACF) in a CPW area. Here, since the ACF bonding is performed in the CPW area, it is advantageous that an electrical loss at a disconnected point can be reduced by the ground (GND) pattern in the CPW area.

Also, the ACF bonding point may be selected as a point 2) among points 1) to 5). Accordingly, as the ACF bonding point is selected as the point 2) that is a boundary between a transparent area and an opaque area of the display, the CPW feeder 1121 such as a feed line may be disposed on the opaque area. On the other hand, a transparent film radiator, such as the in-display antenna 1110, may be disposed on the transparent area.

Referring to FIG. 5B, the in-display antenna 1110 may be connected to a main PCB through an FPCB. In this regard, the in-display antenna 1110 may be connected to the main PCB through a connector that is connected to an end portion of the FPCB. In this case, the connector may be electrically connected to a substrate disposed on the main PCB. Accordingly, the in-display antenna 1110 may be connected to a transceiver circuit 1250 disposed on the main PCB through the FPCB. Also, a power management integrated circuit (PMIC) may be disposed on the main PCB to supply power to the transceiver circuit 1250 or the baseband processor 1400 and control/manage the supplied power.

In short, to supply a signal to a film-type antenna designed on a single layer according to the present disclosure, a feed line transition step to be explained hereinafter may be performed. The feed line transition step may be carried out through the connector (in contact with the main PCB)→(microstrip line)→ACF bonding (CPW-G; Coplanar Waveguide having a ground plane)→film-type antenna (1 layer).

Meanwhile, in relation to the in-display antenna of the film-type antenna structure according to the present disclosure, the copper foil on the lower end of the OLED panel plays a role of a ground plane of a film-type patch antenna, which may result in securing high directionality toward the front surface of the display.

Also, the in-display antenna proposed in the present disclosure can steer beams through a phase delay circuit, and may operate in a vertical/horizontal polarization mode according to a feed line configuration.

Hereinafter, 1) a signal line as an FPCB feed line in an external area of a display will be described with reference to FIGS. 5A and 5B. In this regard, the FPCB feed line is a microstrip line-based signal line and may transfer a signal applied from a source to the antenna. As one example, a top surface of the FPCB is a ground plane, a bottom surface is a signal line, and an electric field distribution of a cross-section may be the same as or similar to an electric field distribution of a microstrip line. As another example, a bottom surface of the FPCB is a ground plane, a top surface is a signal line, and an electric field distribution of a cross-section may be the same as or similar to an electric field distribution of a microstrip line.

Hereinafter, 2) a bonding portion between the FPCB and the COP, which corresponds to a connection portion between a FPCB feed line and the in-display antenna will be described. In this regard, the FPCB signal line and a film-type antenna may be bonded to each other through ACF bonding. For the ACF bonding, it has a co-planar waveguide with ground (CPW-G) type structure and is similar to an electric field distribution of a microstrip line. Also, the CPW-G is insensitive to the changes of characteristic impedance due to external factors such as structural changes, coupling, process errors, etc., compared to the microstrip line or CPW structure. Therefore, the CPW-G structure has a stable transition characteristic at the bonding portion between the signal line and the antenna.

Hereinafter, an antenna module having a display antenna structure according to the present disclosure and an electronic device including the antenna module are described in detail with reference to the drawings.

Figure 6A:
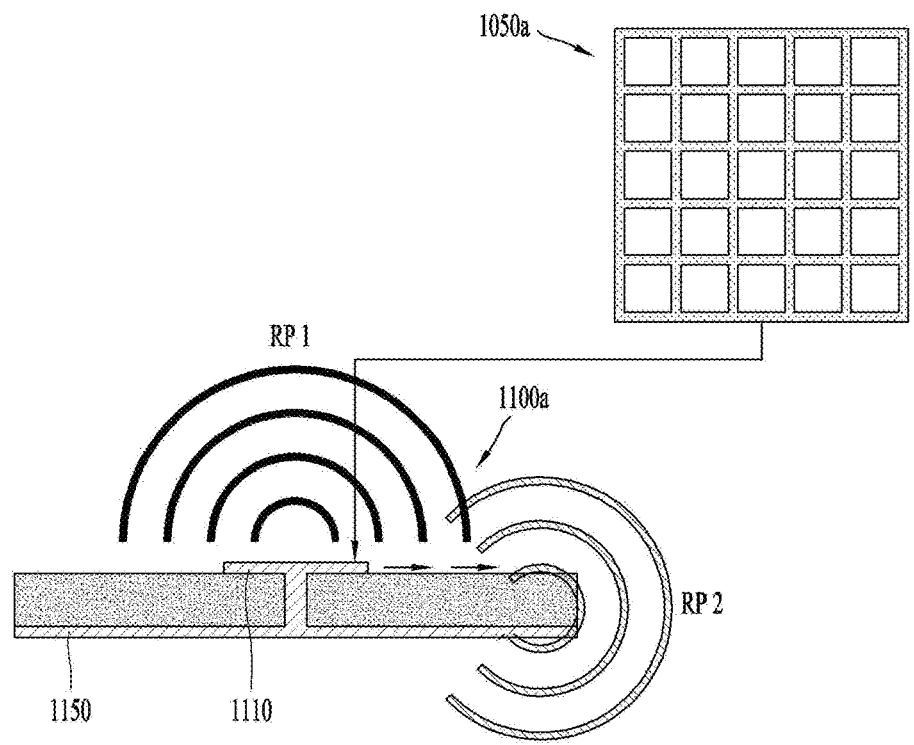
FIGS. 6A to 6C are conceptual diagrams illustrating metal mesh grids according to embodiments of the present disclosure and antenna radiation patterns corresponding thereto.
Figure 6B:
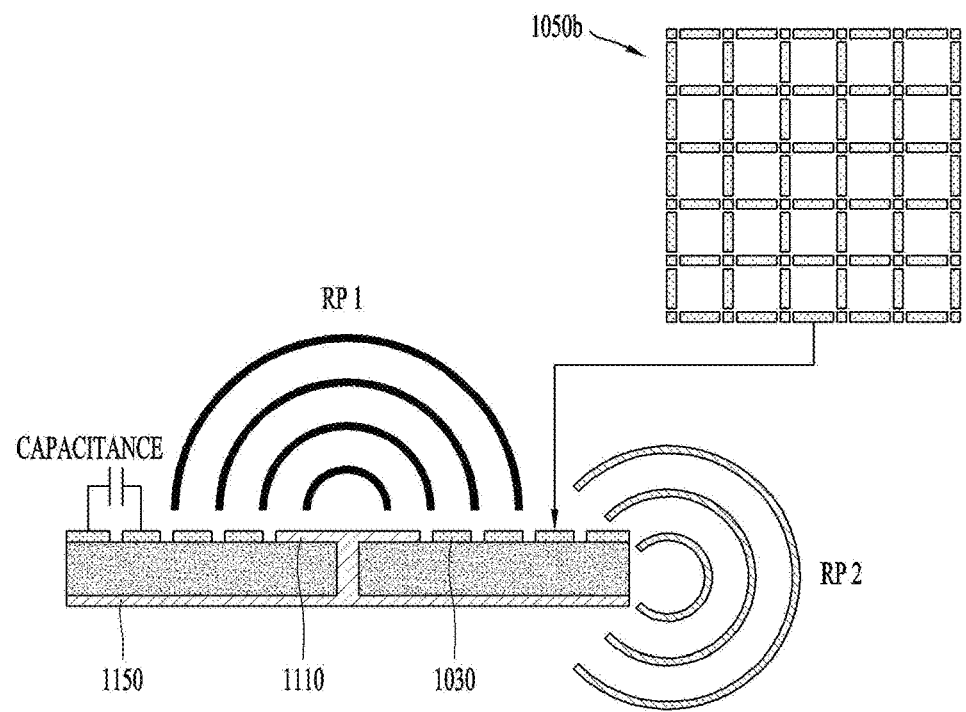
Figure 6C:
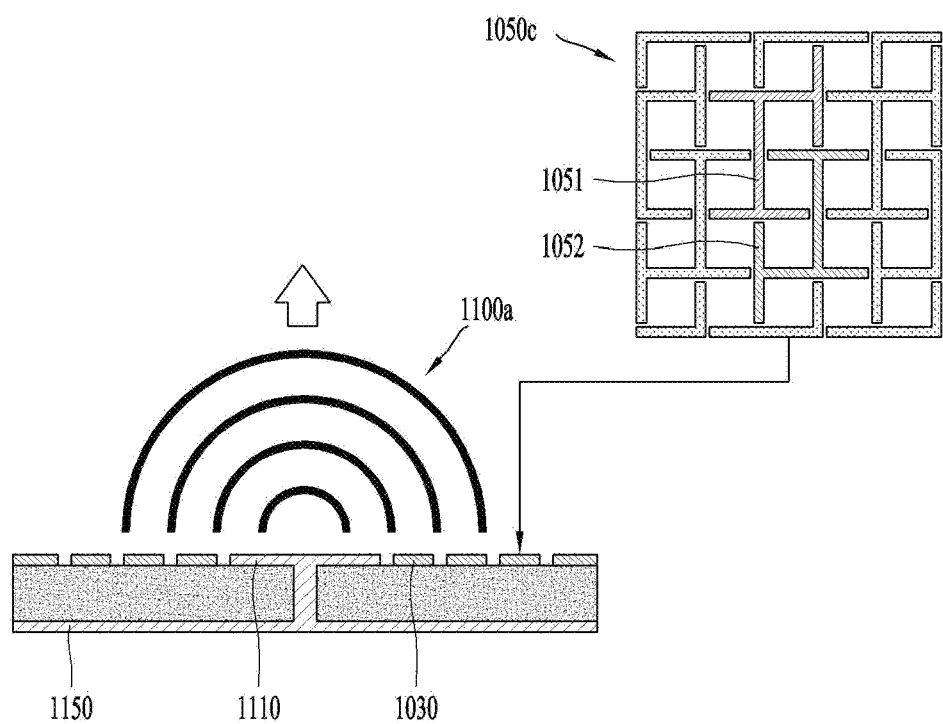

FIGS. 6A to 6C are conceptual diagrams illustrating metal mesh grids according to embodiments of the present disclosure and antenna radiation patterns corresponding thereto.

Referring to FIG. 6A, metal lines constituting a metal mesh grid 1050a are configured to be interconnected to each other in both one axis direction and another axis direction. A ground pattern 1150 is disposed at a bottom of an antenna module 1100a and an antenna pattern 1110 is disposed at a top thereof. In relation to this, the antenna pattern 1110 and the ground pattern 1150 may include metal mesh grids

1050a in which the metal lines are connected to each other in both one axis direction and the another axis direction. The antenna pattern 1110 produces an upward radiation pattern RP1, and produces a sideward radiation pattern RP2 due to a surface wave in a direction toward a side surface of a substrate.

In relation to this, the antenna pattern 1110 disposed on the ground pattern 1150, e.g., a patch antenna radiates a strong electromagnetic wave in a direction perpendicular to the patch antenna. However, a surface wave flowing along the ground pattern 1150 is present. The surface wave may not only cause an interference to peripheral components/elements, but also induce leakage current in adjacent antennas during antenna arrangement, thus resulting in unwanted radiation. The unwanted radiation caused by the surface wave may worsen radiation efficiency of an antenna pattern and distort a radiation pattern.

In addition, in a case of a design of a transparent antenna design using a metal mesh, an open dummy structure having a shape of a segmented metal mesh may be applied to improve optical visibility. In relation to this, referring to FIG. 6B, metal lines constituting a metal mesh grid 1050b are disposed in a dielectric region other than a radiator region of a substrate to be disconnected from each other at intersection points. The ground pattern 1150 at a bottom and the antenna pattern 1110 at a top include metal mesh grids 1050a in which metal lines are interconnected with each other at the intersection points. On the other hand, metal mesh grids 1050b are disposed in the dielectric region to constitute a dummy region. The antenna pattern 1110 produces an upward radiation pattern RP1, and produces a sideward radiation pattern RP2 due to a surface wave in a direction toward a side surface of the substrate. In relation to this, a side radiation component is generated by a capacitance component between the metal mesh grids 1050b in the dummy region. As an example, a low impedance surface of 39 Ω/sq in a band of about 60 GHz is made by the metal mesh grids 1050b.

Referring to FIG. 6C, metal lines constituting a metal mesh grids 1050 in a dielectric region other than a radiator region of a substrate are configured to constitute a unit cell structure to be disconnected from adjacent metal lines. The ground pattern 1150 at a bottom and the antenna pattern 1110 at a top include metal mesh grids 1050a in which metal lines are interconnected with each other at intersection points. On the other hand, the metal mesh grids 1050c having a unit cell structure are disposed in the dielectric region to constitute a dummy region. The metal mesh grids 1050c may include a first unit cell structure 1051 and a second unit cell structure 1052. The second unit cell structure 1052 may be configured to have a symmetrical structure or a structure rotated at a certain angle with respect to the first unit cell structure 1051.

The antenna pattern 1110 may produce an upward radiation pattern RP1 while suppressing production of a sideward radiation pattern due to a surface wave in a direction toward a side surface of the substrate. In relation to this, a side radiation component may be suppressed by a combination of an inductive component and a capacitance component of the metal mesh grids 1050c in the dummy region. As an example, a high impedance surface of 5600 Ω/sq in a band of about 60 GHz is made by the metal mesh grids 1050c.

In the present disclosure, a mesh structure to be used as an open dummy may be designed to have a particular resonance frequency by varying a segmentation form of the mesh structure. In addition, a method of designing an open dummy mesh having a very high impedance characteristics in a target band by matching the particular resonance frequency with an antenna operating frequency is proposed. In detail, a resonance frequency may be adjusted and swept by adjusting current path through the first unit cell structure 1051 and the second unit cell structure 1052.

The open dummy metal mesh proposed herein operates as a high impedance surface (HIS) having high impedance characteristics amounting to about 5600 Ω/sq in a 60 GHz band. Accordingly, this may greatly help to ensure isolation between adjacent antennas and suppress leakage current to peripheral elements.

Additionally, current may be concentrated on an antenna to which the HIS is applied so that applied power is completely radiated into air to thereby greatly increase radiation efficiency and an antenna gain. As an example, the radiation efficiency may be increased by about 45% from about 44% to 89% compared to that of an antenna to which only an open dummy structure is applied. A maximum radiation gain may be increased by about 2.44 dB from 9.11 dBi to 11.55 dBi with reference to a 1×4 patch array antenna. In addition, the metal mesh grids 1050c of FIG. 6C is configured so that metal lines constitute a unit cell structure while being disconnected from adjacent metal lines. Thus, optical visibility may be easily ensured.

Hereinafter, a dummy mesh grid structure of the dummy region according to the present disclosure as shown in FIG. 6C is described in detail. In relation to this, FIGS. 7A and 7B illustrate a front view of the dummy mesh grid structure in the dummy region, and a current distribution induced in metal lines according to the present disclosure.

Figure 7A:
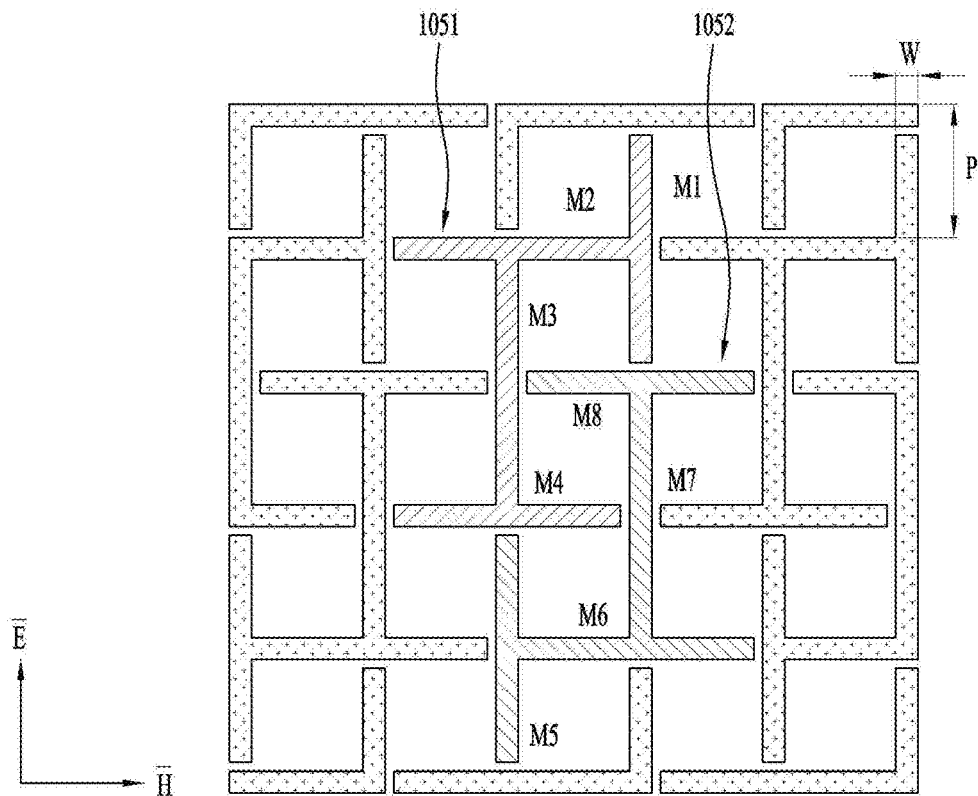
FIGS. 7A and 7B illustrate a front view of a dummy mesh grid structure of a dummy region, and a current distribution induced in metal lines according to the present disclosure.
Figure 7B:
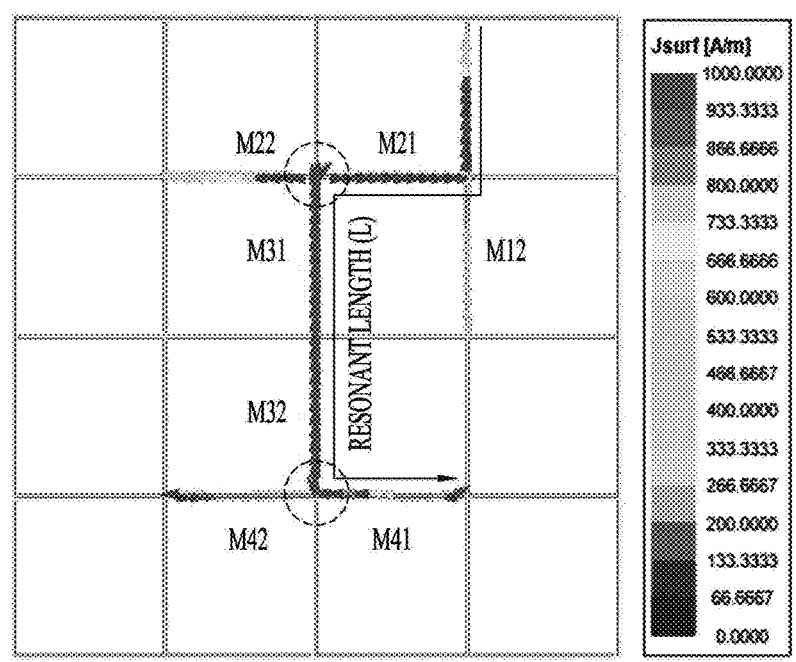

Referring to FIG. 7A, the dummy mesh grids 1050c may include the first unit cell structure 1051 and the second unit cell structure 1052. The second unit cell structure 1052 may be configured to have a symmetrical structure or a structure rotated at a certain angle with respect to the first unit cell structure 1051.

The first unit cell structure 1051 may be configured to include a first metal line M1 to a fourth metal line M4. Meanwhile, the second unit cell structure 1052 may be configured to include a fifth metal line M5 to an eighth metal line M8. A detailed structure in metal lines in the first unit cell structure 1051 and the second unit cell structure 1052 will be described in detail with reference to FIGS. 9A and 9B.

A width of and a pitch between respective metal lines constituting dummy mesh grids 1050c may be denoted as W and P, respectively. Referring to FIG. 7B, radiation of a wireless signal may be suppressed at a particular frequency according to a resonant length L of the first unit cell structure 1051 constituting the dummy mesh grids 1050c. Accordingly, side radiation of the wireless signal may be suppressed in the dummy region other than an antenna region, thereby improving antenna efficiency. In relation to this, the particular frequency for suppressing the side radiation of the wireless signal may be changed by changing the resonant length L of the dummy mesh grids 1050c. With reference to (a) of FIG. 13, a change in a characteristic impedance according to the resonant length L of the dummy mesh grids 1050c and a frequency is described in detail.

The particular frequency for suppressing side radiation of the wireless signal may be changed by changing the width W of each metal line constituting the dummy mesh grids 1050c. With reference to (b) of FIG. 13, a change in characteristic impedance depending on the width W of each metal line constituting the dummy mesh grids 1050c and a frequency will be described in detail. The particular frequency for suppressing side radiation of the wireless signal may be changed by changing the pitch P between the metal lines constituting the dummy mesh grids 1050c.

Referring to FIGS. 7A and 7B, the first unit cell structure 1051 and the second unit cell structure 1052 may be cross-arranged so that the open dummy structure has periodic repeatability of a shape. Meanwhile, to increase a capacitance between the first unit cell structure 1051 and the second unit cell structure 1052 adjacent to each other, a dummy lattice may be configured to have a bent shape to strengthen current intensity at segment points P1 and P2 in contact with an adjacent structure. In relation to this, referring to FIG. 7B, the first and fourth metal lines M1 and M4 may be configured to have a bent shape in the first unit cell structure 1051. Meanwhile, a periodic structure of a pole 'I' has best repeatability, but has weakest current intensity at a segmental point in contact with an adjacent structure. Thus, there may be a difficulty in generating resonance. Accordingly, the first unit cell 1051 structure is configured such that the second and fourth metal lines M2 and M4 are connected to an upper part and a lower part, respectively, with reference to the third metal line M3 having a pole shape. Additionally, the first metal line M1 may be disposed in an end portion of the second metal line M2 perpendicularly to the second metal line M2 to thereby define a resonant length to have a high current intensity.

In relation to this, the second metal line M2 may be disposed on at least one side of a first end portion of the third metal line M1 of the first unit cell structure 1151. In addition, the first metal line M1 may be disposed on at least one side of the first end portion of the second metal line M2. In addition, the fourth metal line M4 may be disposed on at least one side of a second end portion of the third metal line M1. In relation to this, a region with a low current distribution, e.g., a second portion M12 of the first metal line and a first portion M41 of the fourth metal line may be configured to be disconnected from a first part M11 of the first metal line and a second portion M42 of the fourth metal line. In addition, a second part M22 of the second metal line may be configured to be disconnected from a first part M21 of the second metal line.

Figure 8A:
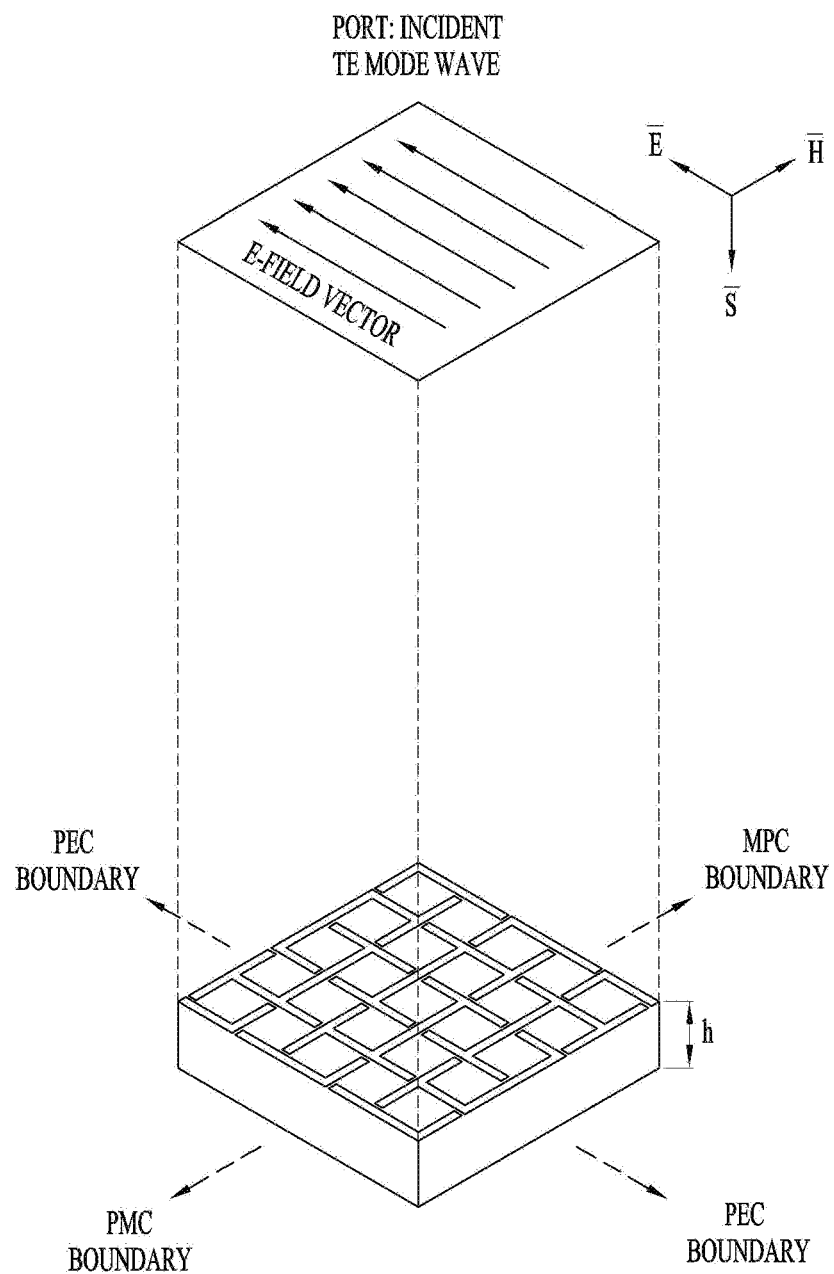
FIG. 8A is a conceptual diagram of a method of periodic structure analysis of the dummy mesh grid structure according to the present disclosure using a Floquet mode.
Figure 8B:
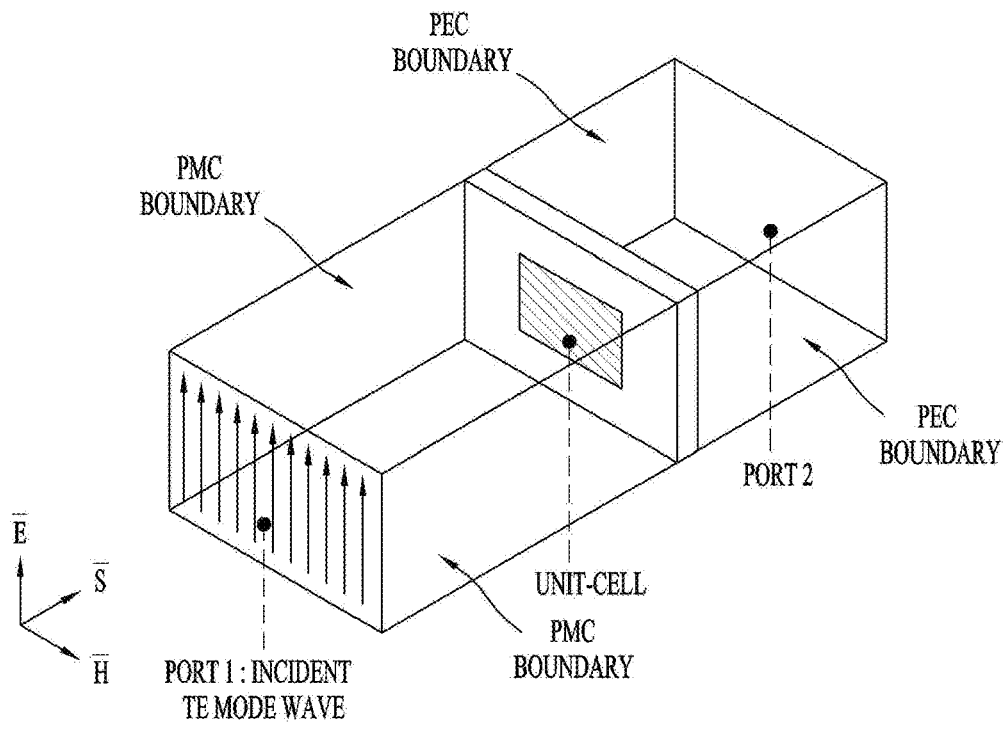
FIG. 8B is a structure diagram for periodic structure analysis using a Floquet mode.
Figure 8B:
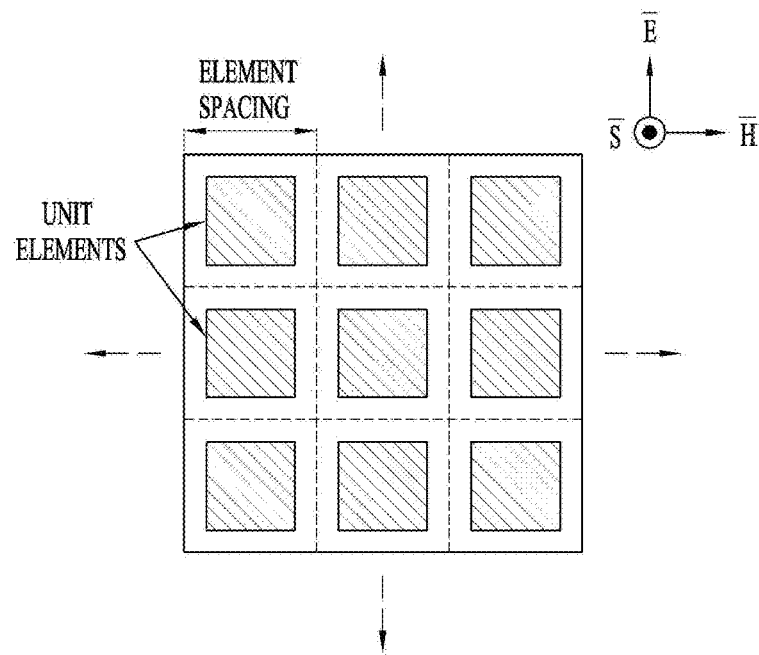

Hereinafter, a method of analysis of a dummy mesh grid structure according to the present disclosure is described. FIG. 8A is a conceptual diagram of a method of periodic structure analysis of the dummy mesh grid structure according to the present disclosure using a Floquet mode. FIG. 8B is a structure diagram for periodic structure analysis using a Floquet mode.

Referring to FIG. 8A, the periodic structure analysis may be performed on a dielectric substrate 1010 on which the dummy mesh grids 1050c of FIGS. 7A and 7B are disposed. In relation to this, both end portions of the dielectric substrate 1010 in one axis direction may be regarded as perfect electric conductors (PECs). An electric field may be generated in one axis direction of the dielectric substrate 1010. Meanwhile, both end portions of the dielectric substrate 1010 in another axis direction may be regarded as perfect magnetic conductors (PMCs). A magnetic field may be generated in one axis direction of the dielectric substrate 1010.

An electric field may be generated in a direction in which current is applied to the antenna pattern 1110 of FIGS. 6A to 6C. Accordingly, the electric field may be generated in a direction of one axis of the dielectric substrate 1010, and thus, a current distribution generated in the dummy mesh grid 1050c may be analyzed. Accordingly, the dummy metal mesh 1050c provided herein operates as a high impedance surface (HIS) having a high impedance characteristic amounting to about 5600 Ω/sq in a 60 GHz band. Accordingly, this may greatly help to ensure isolation between adjacent antennas and suppress leakage current to peripheral elements.

Referring to (a) of FIG. 8B, an electric field may be regarded as being applied to a metal region of the dielectric substrate 1010 on a plane corresponding to port 1 to analyze a repetitive periodic structure of the dummy mesh grid 1050c of FIGS. 7A and 7B. In relation to this, planes constituting both end portions of the dielectric substrate 1010 in one axis direction may be regarded as PEC boundaries. The PEC boundaries correspond to planes parallel to a direction in which an electric field is generated. Planes constituting both end portions of the dielectric substrate 1010 in another axis direction may be regarded as PMC boundaries. The PMC boundaries correspond to planes parallel to a direction in which a magnetic field perpendicular to the electric field is generated.

The repetitive periodic structure of the dummy mesh grid 1050c of FIG. 7A may be analyzed by replacing the unit cell of (a) of FIG. 8B with the first unit cell 1051 and/or the second unit cell 1052 of FIG. 7A. Referring to FIGS. 7A and (b) of 8B, a unit element may be replaced with the dummy mesh grid 1050c of FIG. 7A. Element spacing of the unit element may be configured as element spacing of the dummy mesh grid 1050c of FIG. 7A. An electric field may be generated in a direction of one axis of the dielectric substrate 1010, and thus, a current distribution generated in the dummy mesh grid 1050c may be analyzed. Accordingly, the dummy mesh grid 1050c provided herein operates as a high impedance surface (HIS) having a high impedance characteristic amounting to about 5600 Ω/sq in a 60 GHz band. Accordingly, this may greatly help to ensure isolation between adjacent antennas and suppress leakage current to peripheral elements.

Figure 9A:
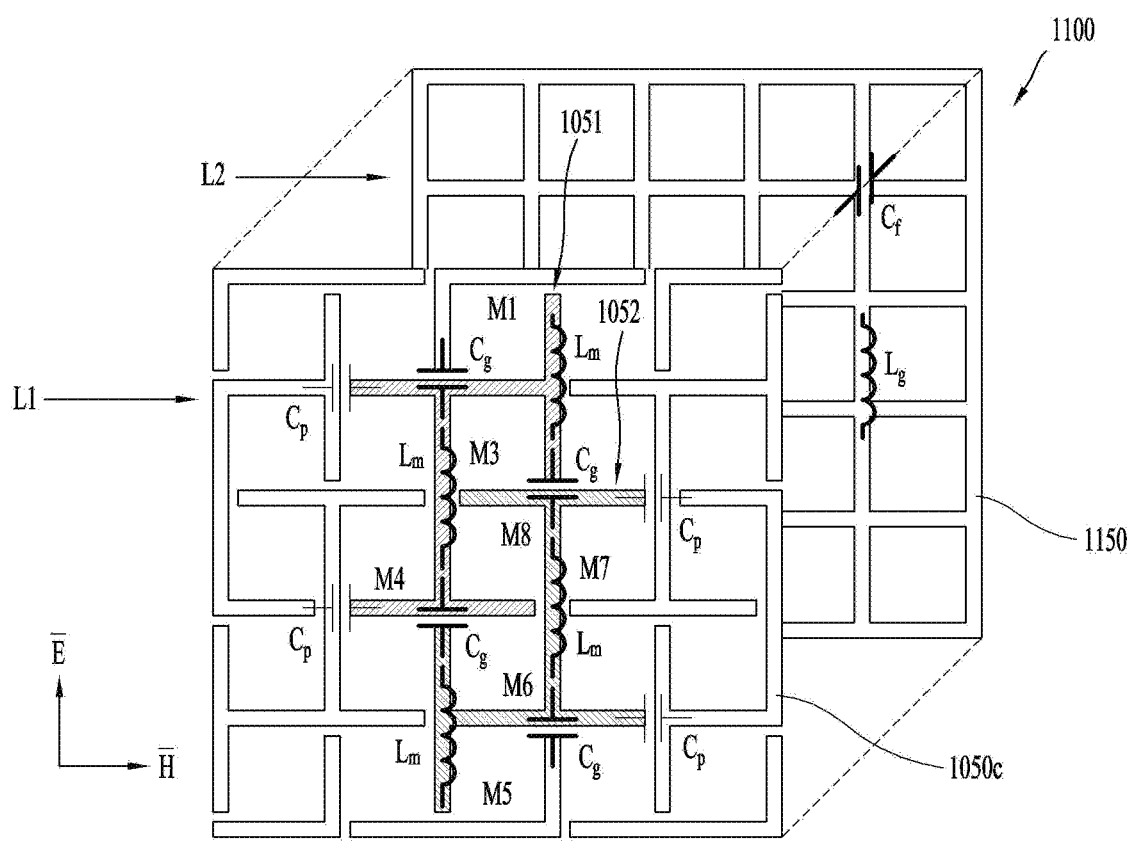
FIG. 9A illustrates a HIS structure according to a dummy mesh grid structure and a metal mesh grid structure of a ground, and an equivalent circuit according to the HIS structure.
Figure 9B:
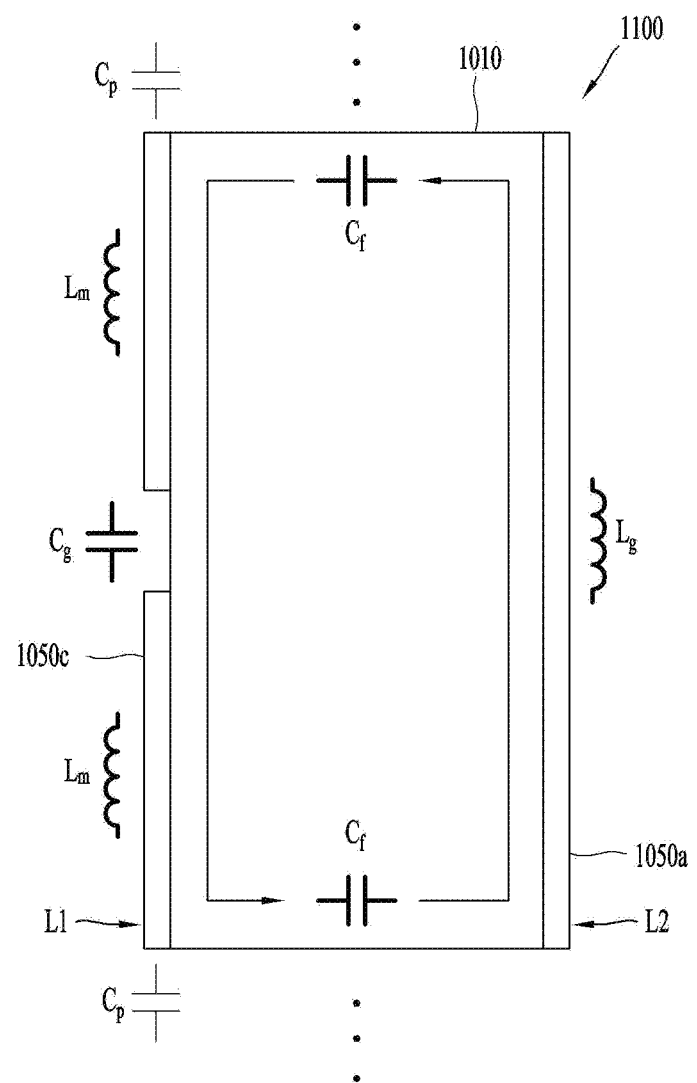
FIG. 9B illustrates an equivalent circuit viewed from a side of a dielectric substrate having first and second layers on which a dummy mesh grid structure and a metal mesh grid structure of a ground are implemented.

The HIS structure provided by a dummy mesh grid structure and a metal mesh grid structure of a ground according to the present disclosure is described in detail with reference to an equivalent circuit. In relation to this, FIG. 9A illustrates a HIS structure caused by a dummy mesh grid structure and a metal mesh grid structure of a ground, and an equivalent circuit according to HIS structure. Meanwhile, FIG. 9B illustrates an equivalent circuit viewed from a side of a dielectric substrate having first and second layers on which a dummy mesh grid structure and a metal mesh grid structure of a ground are implemented.

Figure 10A:
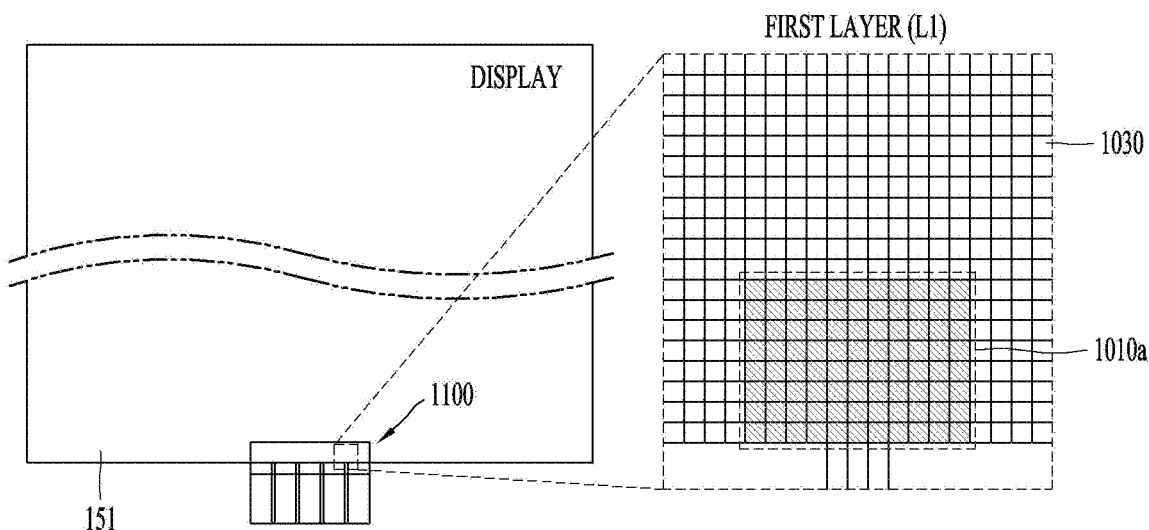
FIG. 10A illustrates a configuration in which an antenna module disposed as a transparent substrate is arranged in one region of a display of an electronic device, and an enlarged view of an antenna element and a peripheral region of the antenna element.
Figure 10B:
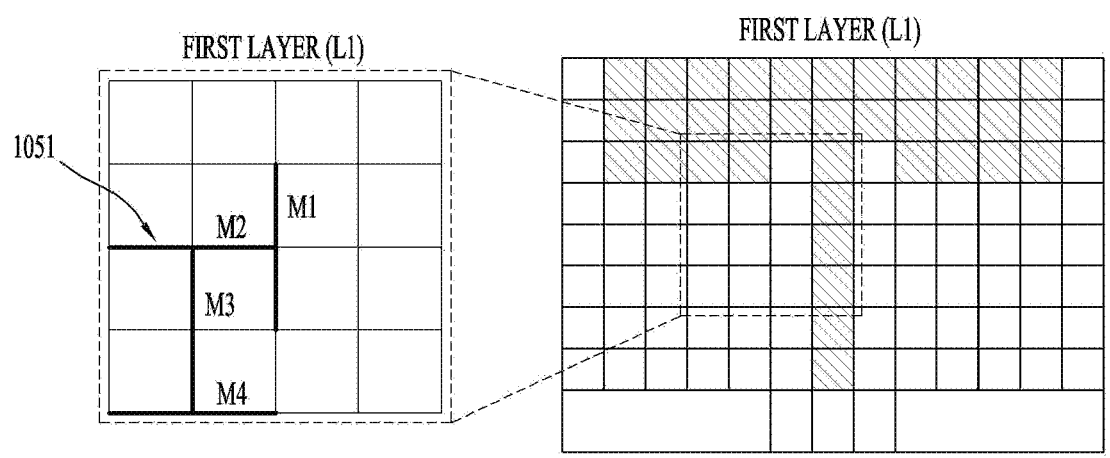
FIG. 10B is an enlarged view of a lower region of the antenna element of FIG. 10A.

FIG. 10A illustrates a configuration in which an antenna module disposed as a transparent substrate is arranged in one region of a display of an electronic device, and an enlarged view of an antenna element and a peripheral region of the antenna element. FIG. 10B is an enlarged view of a lower region of the antenna element of FIG. 10A.

Referring to FIGS. 6A to 7A and 9A to 10B, the antenna module 1100 may be configured to include the dielectric substrate 1010, a first layer L1, and a second layer L2. The dielectric substrate 1010 may be configured as a transparent substrate disposed on a surface of or inside a display of an electronic device or on a surface of or inside glass of a vehicle, but is not limited thereto.

The first layer L1 may be disposed on a front surface of the dielectric substrate 1010. The first layer L1 may include a radiator region 1010a including the metal mesh grid 1050a and a dummy region 1030 including the dummy mesh grid 1050c constituting of a plurality of patterns.

The metal mesh grid 1050a in the radiator region 1010a may be configured such that metal lines are interconnected to each other. A current may be generated through the radiator region 1010*a* via the metal lines of the metal mesh grid 1050*a*, and a wireless signal may be radiated by the current generated through the radiator region 1010*a*.

The metal mesh grid 1050*a* is configured such that the metal lines are connected to each other in one axis direction and in another axis direction perpendicular to the one axis direction. On the other hand, the dummy mesh grid 1050*c* is configured such that metal lines are segmented or disconnected at some intersection points. In relation to this, the dummy mesh grid 1050*c* may include the first unit cell 1051 and/or the second unit cell 1052. Meanwhile, the second layer L2 may be disposed on a rear surface of the dielectric substrate 1010. The second layer L2 may be configured so that the metal mesh grid 1050*a* operates as a ground.

The dummy mesh grid 1050*c* may include a plurality of patterns consisting of the first to fourth metal lines M1 to M4. In this regard, the first metal line M1 and the third metal line M3 may be configured as lines parallel to each other. The second metal line M2 may be configured to connect the first metal line M1 to the third metal line M3. The fourth metal line M4 may be configured to be connected to a second end portion of the third metal line M3.

A capacitive component Cf may be constituted between the plurality of patterns of the dummy mesh grid 1050*c* on the first layer L1 and the metal mesh grid 1050*a* on the second layer L2. An inductive component Lg may be disposed in the metal mesh grid 1050*a* on the second layer L2. Accordingly, side surface radiation at the first layer L1 may be prevented by the capacitive component Cf between the first and second layers L1 and L2 and the inductive component Lg of the second layer L2. Accordingly, radiation efficiency and directivity of an antenna element 1110 toward a front direction may be enhanced.

Hereinafter, the dummy mesh grid 1050*c* according to the present disclosure is described in detail with reference to FIG. 9A. First and second end portions of the first metal line M1 may be configured to be disconnected from adjacent metal lines. The first end portion of the second metal line M2 may be connected to the first metal line M1, and a second end portion of the second metal line M2 may be disconnected from an adjacent metal line. The first and second end portions of the third metal line M3 may be connected to the second metal line M2 and the fourth metal line M4. First and second end portions of the fourth metal line M4 may be configured to be disconnected from adjacent metal lines.

The dummy mesh grid 1050*c* including a plurality of patterns in the dummy region 1030 may configure the first unit cell 1051. The first unit cell 1051 may be configured such that the first and second end portions of the first metal line M1, the second end portion of the second metal line M2, and the second end portion of the fourth metal line M4 are disconnected from adjacent metal lines to prevent side radiation at the first layer L1. The first end portion of the fourth metal line M4 may be configured to be disconnected from the seventh metal line M7 of the second unit cell 1052.

The dummy mesh grid 1050*c* including the plurality of patterns in the dummy region 1030 may configure the second unit cell 1052. The second unit cell 1052 may be configured such that first and second end portions of the fifth metal line M5, a second end portion of the sixth metal line M6, and the second end portion of the eighth metal line M8 are disconnected from adjacent metal lines to prevent side radiation at the first layer L1. A first end portion of the eighth metal line M8 may be configured to be disconnected from the third metal line M3 of the first unit cell 1051.

Meanwhile, the first metal line M1 to the fourth metal line M4 of the first unit cell 1051 may constitute an inductive component and a capacitive component. Accordingly, the first unit cell 1051 may be designed to have a high impedance in a particular frequency band, e.g., about a 60 GHz band. In this regard, the first metal line M1 and the third metal line M3 may constitute a first inductive component Lm. The first inductive component Lm is an inductance corresponding to a current path induced in an open dummy lattice.

Meanwhile, a first capacitive component Cg may be constituted between adjacent metal lines at a center point of the second metal line M2 and a center point of the fourth metal line M4, respectively. The first capacitive component Cg is a capacitance corresponding to spacing between adjacent open dummy lattices. The second end portion of the second metal line M2 and the second end portion of the fourth metal line M4 may each constitute the second capacitive component Cp between adjacent metal lines. The second capacitive component Cp corresponds to parasitic capacitance due to unwanted polarization between adjacent open dummy lattices.

The dummy mesh grid 1050*c* may include the first unit cell 1051 and/or the second unit cell 1052. In relation to this, a plurality of patterns in the dummy mesh grid 1050*c* may be configured to include the first unit cell 1051 and the second unit cell 1052.

The first unit cell 1051 may be configured to include the first metal line M1 to the fourth metal line M4. Meanwhile, the second unit cell 1052 may be configured to include the fifth metal line M5 to the eighth metal line M8. The fifth metal line M5 and the seventh metal line M7 may be configured as lines parallel to each other. The sixth metal line M6 may be configured to connect the fifth metal line M5 to the seventh metal line M7. The eighth metal line M8 may be configured to be connected to a second end portion of the seventh metal line M7.

A detailed configuration of the fifth to eighth metal lines M5 to M8 constituting the second unit cell 1052 is described with reference to the disposition of the first unit cell 1051 and adjacent metal lines. A first end portion of the fifth metal line M5 may be disconnected from the fourth metal line M4, and the second end portion of the fifth metal line M5 may be disconnected from an adjacent metal line. A first end portion of the sixth metal line M6 may be connected to the fifth metal line M5, and the second end portion of the sixth metal line M6 may be configured to be disconnected from an adjacent metal line. The first and second end portions of the seventh metal line M7 may be configured to be connected to the sixth metal line M6 and the eighth metal line M8, respectively. The first end portion of the eighth metal line M8 may be disconnected from the third metal line M3, and the second end portion of the eighth metal line M8 may be disconnected from an adjacent metal line.

Meanwhile, a resonance frequency of the dummy lattice structure 1050*c* may be determined by other capacitive/inductive components including the first capacitive component Cg according to a disconnection structure between the first and second unit cells 1051 and 1052. In relation to this, FIG. 11 illustrates inductive and capacitive components of an antenna module having the dummy lattice structure of FIG. 9B as an equivalent circuit with reference to a transmission line.

Figure 11:
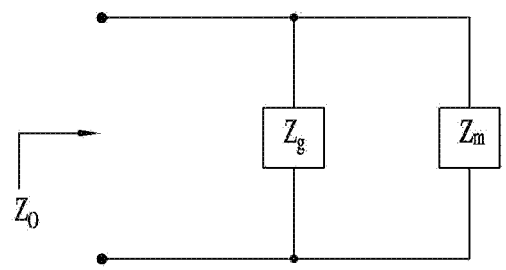
FIG. 11 illustrates inductive and capacitive components of an antenna module having the dummy lattice structure of FIG. 9B as an equivalent circuit with reference to a transmission line.
Figure 11:
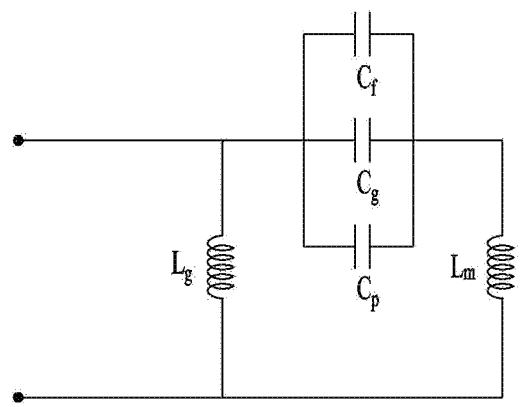

Referring to FIG. 9 and (a) of FIG. 11, an impedance of an antenna module may be modeled as a parallel configuration of an impedance Zm in the first layer L1 and an impedance Zg in the second layer L2. In relation to this, the impedance of the antenna module may be modeled as a configuration of the first inductive component Lm in the first layer L1, the second inductive component Lg in the second layer L2, and the first to third capacitive components Cg, Cp, and Cf.

As described above, a resonance frequency of the dummy lattice structure 1050c may be determined by other capacitive/inductive components including the first capacitive component Cg according to a disconnection structure between the first and second unit cells 1051 and 1052. In relation to this, the first capacitive component Cg may be constituted between a metal line of the first unit cell 1051 and another metal line adjacent thereto. In addition, the first capacitive component Cg may be constituted between a metal line of the second unit cell 1052 and another metal line adjacent thereto. Additionally, the first capacitive component Cg may be constituted between a metal line of the first unit cell 1051 and a metal line of the second unit cell 1052.

In relation to this, a second end portion of the first metal line M1 may be configured to be disconnected from the eighth metal line M8 to constitute the first capacitive component Cg. Additionally, a first end portion of the fourth metal line M4 may be configured to be disconnected from the seventh metal line M7 to constitute the first capacitive component Cg.

Hereinafter, an inductive component and a capacitive component of the second unit cell 1052 is described. In relation to this, the fifth metal line M5 and the seventh metal line M7 may constitute a first inductive component Lm. Meanwhile, the first capacitive component Cg may be constituted between adjacent metal lines at a center point of the sixth metal line M6 and a center point of the eighth metal line M8. A second end portion of the sixth metal line M6 and a second end portion of the eighth metal line M8 may each constitute a second capacitive component Cp between adjacent metal lines.

Meanwhile, in the second layer L2, metal lines constituting a ground mesh grid are interconnected to each other. Accordingly, a second inductive component Lg corresponding to a current path induced in the ground mesh grid is disposed. A third capacitive component Cf may be constituted between the dummy mesh grid 1050c of the first layer L1 and the ground mesh grid.

Accordingly, a characteristic impedance Z0 and a resonance frequency f0 according to the dummy mesh grid 1050c proposed herein may be determined by Equation 1 and Equation 2.

$$Z_0(\omega) = Z_m \| Z_g = j\omega L_g \frac{1 - \omega^2 L_m(C_f + C_g + C_p)}{1 - \omega^2(C_f + C_g + C_p)(L_g + L_m)} \quad [\text{Equation 1}]$$

$$f_0 = \frac{1}{2\pi\sqrt{(C_f + C_g + C_p)(L_g + L_m)}} \quad [\text{Equation 2}]$$

Respective parameters including the aforementioned components, such as the first and second inductive components Lm and Lg and the first to third capacitive components Cg, Cp, and Cf, are described as follows.

Lm: Inductance corresponding to a current path induced in the open dummy lattice Lg: Inductance corresponding to a current path induced in the ground mesh grid Cf: Capacitance corresponding to an electric flux induced between the open dummy lattice and the ground mesh grid Cg: Capacitance corresponding to spacing between adjacent open dummy lattices Cp: Parasitic capacitance due to unwanted polarization in adjacent open dummy lattices Z0: Characteristic impedance of a high impedance open dummy proposed herein Zm: Characteristic impedance of an open dummy lattice surface, i.e. characteristic impedance in the first layer L1

Zg: Characteristic impedance of a ground surface, i.e. characteristic impedance in the second layer L2

Hereinafter, a characteristic impedance and a phase response characteristic according to a frequency of an open dummy mesh grid structure according to the present disclosure are described. In relation to this, FIG. 12 illustrates a characteristic impedance and a phase response characteristic of a reflection coefficient according to a frequency of the open dummy mesh grid structure according to the present disclosure.

FIG. (a) of 12 shows a high impedance characteristic of 5600 Ω/sq in a band of about 60 GHz. Accordingly, a high impedance structure (HIS) of a first or second unit cell structure may suppress antenna side radiation in the band of about 60 GHz which is an operating frequency of the antenna element. Accordingly, antenna efficiency may be enhanced, and distortion of a radiation pattern may be prevented by the HIS of the first or second unit cell structure in the band of about 60 GHz which is the operating frequency of the antenna element.

Figure 12:
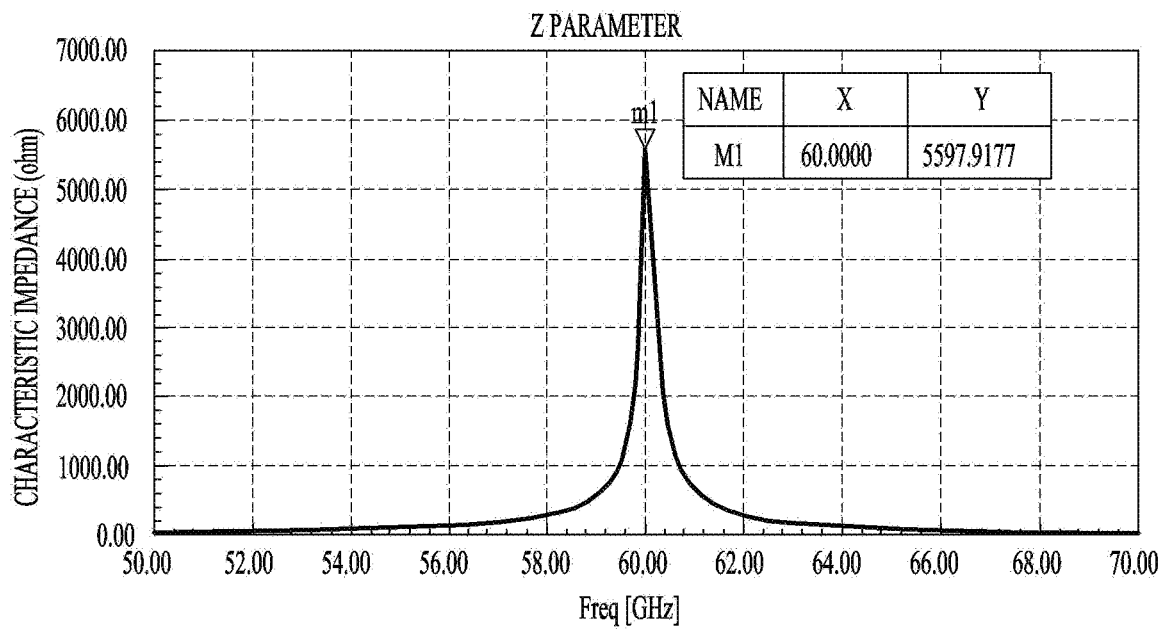
FIG. 12 illustrates a characteristic impedance and a phase response characteristic of a reflection coefficient according to a frequency of an open dummy mesh grid structure according to the present disclosure.
Figure 12:
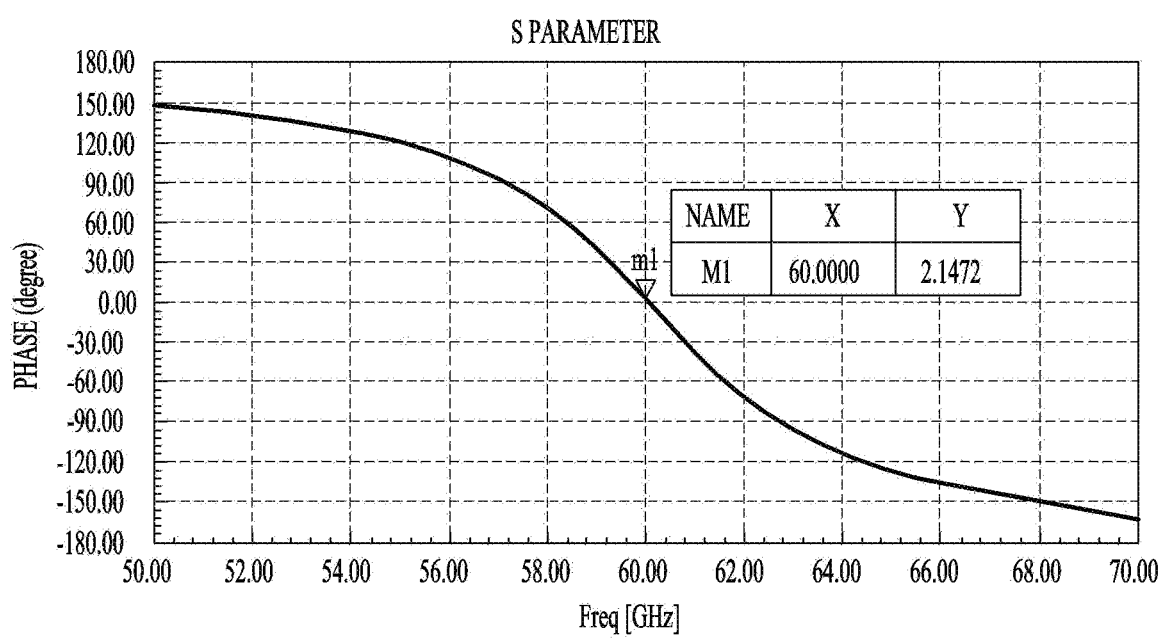

Referring to (a) and (b) of FIG. 12, since the open dummy lattice structure has a resonance characteristic at a target frequency, i.e., 60 GHz, a very high characteristic impedance may be implemented, and at this time, a sign of a phase is reversed at the resonance frequency of 60 GHz. Referring to a phase response curve shown in (b) of FIG. 12, a sign of a phase is reversed from positive to negative at the resonance frequency of 60 GHz. Meanwhile, the open dummy lattice structure operates as a high impedance structure (HIS) in a frequency band corresponding to a section from +90 degrees to −90 degrees in the phase response curve, i.e., 57 GHz to 63 GHz.

The first inductive component Lm is an inductance corresponding to a current path induced in an open dummy lattice.

Meanwhile, a first capacitive component Cg may be constituted between adjacent metal lines both at a center point of the second metal line M2 and a center point of the fourth metal line M4. The first capacitive component Cg is a capacitance corresponding to spacing between adjacent open dummy lattices. The second end portion of the second metal line M2 and the second end portion of the fourth metal line M4 may constitute the second capacitive component Cp between adjacent metal lines, respectively. The second capacitive component Cp corresponds to parasitic capacitance due to unwanted polarization between adjacent open dummy lattices.

Meanwhile, a characteristic impedance according to a change in a resonant length and a width of a unit cell of the open dummy mesh grid structure according to the present disclosure is described below. In relation to this, FIG. 13A illustrates a graph of a characteristic impedance at each frequency according to a change in a resonant length and a width of a unit cell of the open dummy mesh grid structure according to the present disclosure.

Figure 13A:
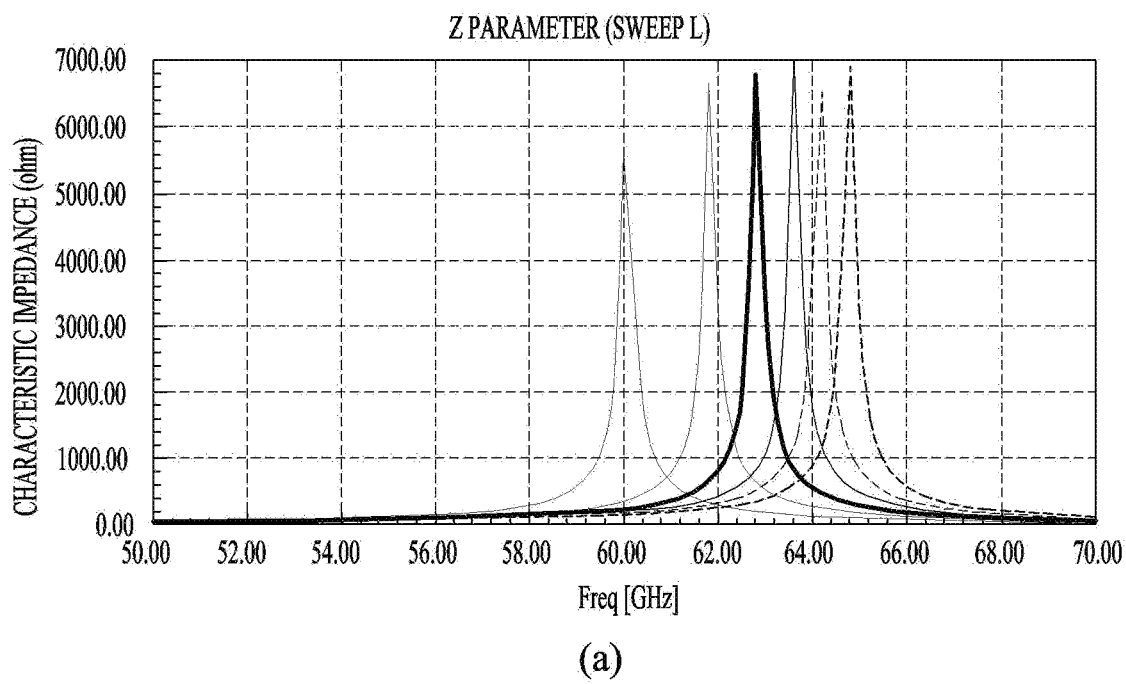
FIG. 13A is a graph of a characteristic impedance at each frequency according to a change in a resonant length and a width of a unit cell of the open dummy mesh grid structure according to the present disclosure.
Figure 13A:
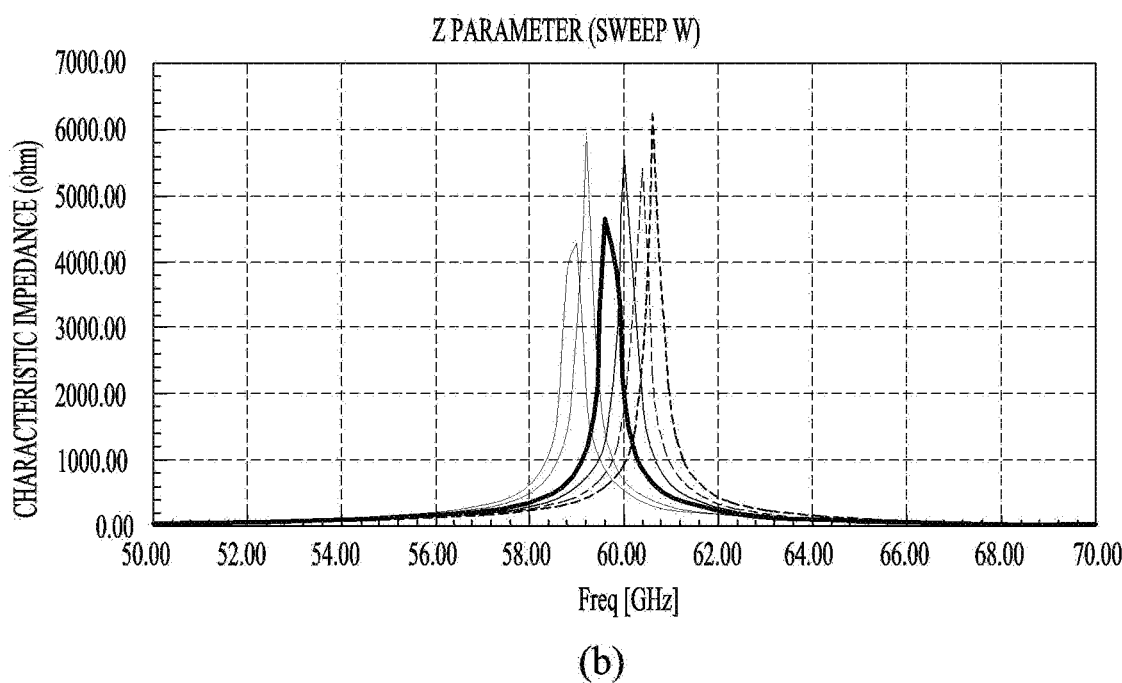

Referring to FIGS. 7A and 7B and (a) of FIG. 13A, as the resonant length L of the unit cell 1051 changes from 500 um to 400 um, a resonance frequency changes from about a 60 GHz band to a high frequency band.

Referring to FIGS. 7A and 7B and (b) of FIG. 13A, as a width W of a metal line of the unit cell 1051 increases from 1.0 um to 2.8 um, a resonance frequency of a characteristic impedance has a value of about 59 GHz to 61 GHz. Such a change in a resonance frequency corresponds to an operating bandwidth range of the unit cell 1051. Accordingly, the width W of a metal line of the open dummy mesh grid structure according to the present disclosure may be set to a range of about 1.0 um to 2.8 um, but is not limited thereto.

Hereinafter, a shape of a unit cell according to a change in a resonant length of a metal line in the open dummy mesh grid structure according to the present disclosure is described. In relation to this, FIG. 13B illustrates a shape change of a unit cell according to a change in a resonant length of a metal line in the open dummy mesh grid structure according to the present disclosure.

Figure 13B:
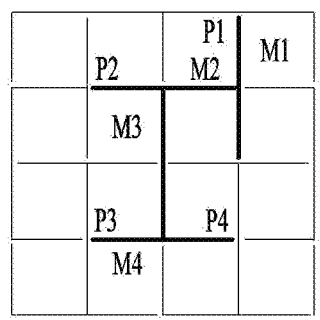
FIG. 13B illustrates a shape change of a unit cell according to a change in a resonant length of a metal line in the open dummy mesh grid structure according to the present disclosure.
Figure 13B:
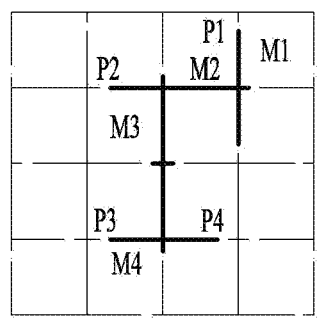
Figure 13B:
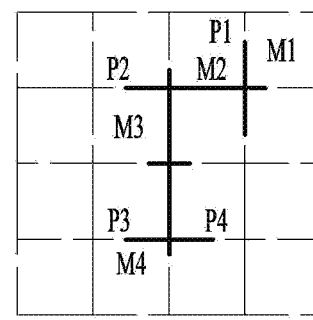
Figure 13B:
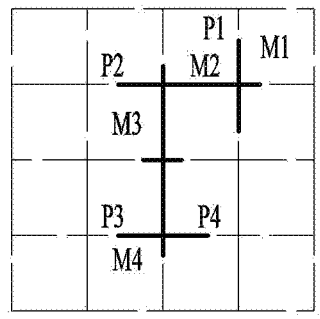
Figure 13B:
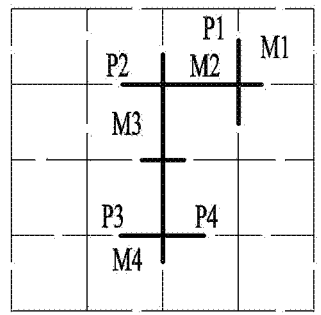
Figure 13B:
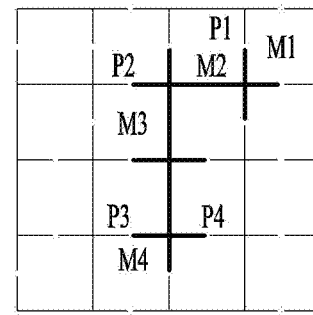

Referring to 7A and 7B and (a) of FIG. 13B, when a resonant length is L=500 um, the unit cell 1051 may be configured such that the first metal line M1 to the fourth metal line M4 are connected to each other at respective intersection points. The first metal line M1 to the fourth metal line M4 may be configured to be disconnected from adjacent metal lines. In relation to this, the first metal line M1 is configured to be disconnected from an adjacent metal line at a first point P1. The second metal line M2 is configured to be disconnected from an adjacent metal line at a second point P2. The fourth metal line M4 is configured to be disconnected from adjacent metal lines at a third point P3 and a fourth point P4.

Referring to (b) to (f) of FIG. 13B, as a resonant length of the unit cell is decreased to L=480 um, 460 um, 440 um, 420 um, and 400 um, lengths of the first metal line M1, the second metal line M2, and the fourth metal line M4 may be decreased.

As the resonant length is decreased, a length of an end portion corresponding to the first point P1 of the first metal line M1 disconnected from the adjacent metal line is decreased. A length of an end portion corresponding to the second point P2 of the second metal line M1 disconnected from the adjacent metal line is decreased. In addition, lengths of end portions corresponding to the third and fourth points P3 and P4 of the fourth metal line M4 disconnected from the adjacent metal lines decrease. Accordingly, a point at which a metal line is disconnected in the open dummy mesh grid structure may be partially changed in the unit cell to adjust a resonance frequency in the HIS structure.

Meanwhile, a resonance frequency of the open dummy mesh grid structure may be adjusted by adjusting a pitch interval of the open dummy mesh grid structure according to the present disclosure. In relation to this, FIGS. 14A and 14B illustrate a phase response curve and a characteristic impedance curve according to changes in a pitch interval and a frequency of the open dummy mesh grid structure according to the present disclosure.

Referring to FIG. 7A, a width and a pitch of each metal line constituting the dummy mesh grid 1050c may be denoted as W and P, respectively. A particular frequency, i.e., a resonance frequency for suppressing side radiation of a wireless signal may be changed by changing the pitch P between the metal lines constituting the dummy mesh grid 1050c.

Figure 14A:
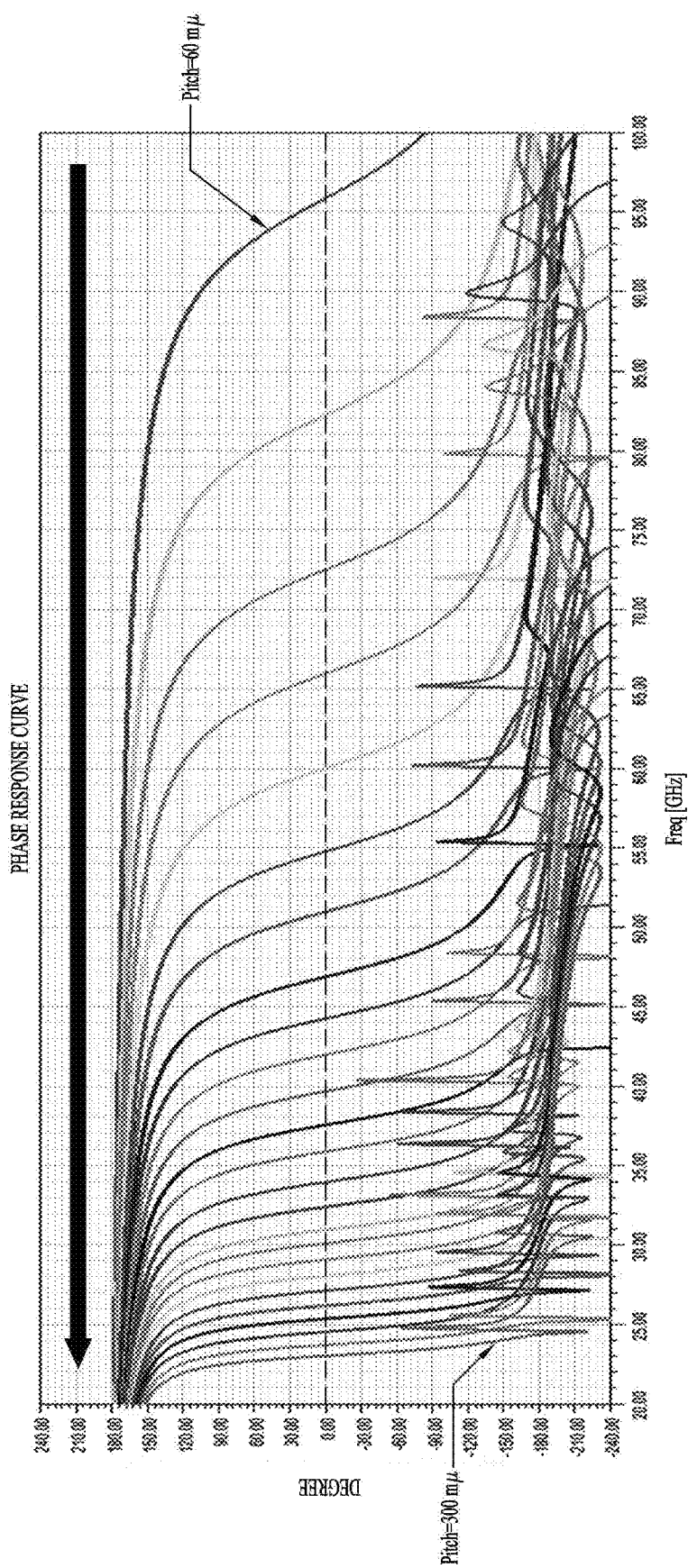
FIGS. 14A and 14B illustrate a phase response curve and a characteristic impedance curve according to changes in a pitch interval and a frequency of the open dummy mesh grid structure according to the present disclosure.

Referring to FIGS. 7A and 14A, the pitch P between metal lines constituting the dummy mesh grid 1050c may be adjusted in a range from 300 um to 60 um to ensure high impedance performance in a wide frequency band from 20 GHz to 100 GHz. Referring to the phase response curve of FIG. 14A, when the pitch P between metal lines is 300 um, a phase switches from a positive value to a negative value through 0 at about 20 GHz. In addition, when the pitch P between metal lines is 60 um, a phase switches from a positive value to a negative value through 0 at about 100 GHz.

Figure 14B:
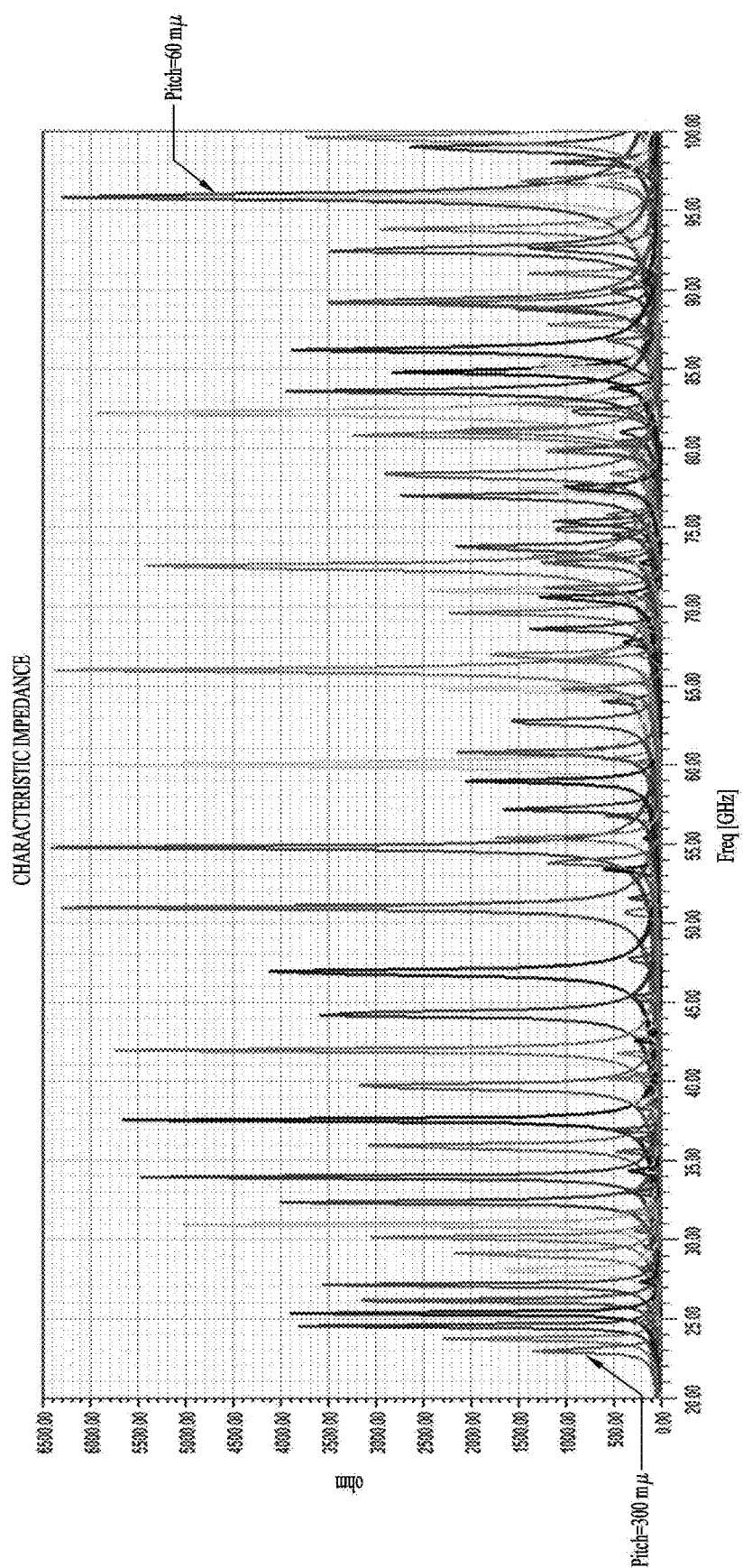

Referring to FIGS. 7A and 14B, the pitch P between metal lines constituting the dummy mesh grid 1050c may be adjusted in a range from 300 um to 60 um to ensure high impedance performance in a wide frequency band from 20 GHz to 100 GHz. Referring to the phase response curve of FIG. 14B, when the pitch P between metal lines is 300 um, a characteristic impedance has a maximum value at about 20 GHz. In addition, when the pitch P between the metal lines is 60 um, a characteristic impedance has a maximum value at about 100 GHz.

In relation to this, high impedance performance may be ensured in a wide frequency band from 20 GHz to 100 GHz by variously configuring a pitch interval of the dummy mesh grid 1050c from 300 um to 60 um. Accordingly, the dummy mesh grid 1050c including a disconnected structure and unit cells according to the present disclosure may operate in a wide frequency band from 20 GHz to 100 GHz. Accordingly, it is determined that an operating frequency may be expanded not only to a mmWave band but also to a sub-THz band later.

As another example, a pitch interval of the dummy mesh grid 1050c may include a first pitch interval and a second pitch interval in consideration of an operating frequency band of an antenna. For example, when an antenna is configured as a radiator operating in a 30 GHz band at 60 GHz, a pitch interval of the dummy mesh grid 1050c may include a first pitch interval and a second pitch interval, i.e., about 200 um and 100 um.

Meanwhile, the dummy mesh grid 1050c according to the present disclosure may be configured to have a particular pitch interval, e.g., 100 um to suppress side radiation of a wireless signal at an operating frequency of the antenna, i.e., 60 GHz, but is not limited thereto. An antenna according to the present disclosure may be configured as a dual resonance antenna or separate antennas operating in different bands. Accordingly, a pitch interval of the dummy mesh grid 1050c may be configured to ensure high impedance performance in a wide frequency band from about 20 GHz to 100 GHz. Accordingly, a pitch of the first to eighth metal lines M1 to M8 of the open dummy structure may be set in the range of 60 to 300 um.

Meanwhile, the open dummy mesh grid structure according to the present disclosure may be modified and applied in various forms other than the first unit cell or the second unit cell described above. In relation to this, FIG. 15 illustrates a metal mesh grid of an antenna element and a dummy mesh grid in an adjacent dummy region according to the present disclosure for each area.

Figure 15:
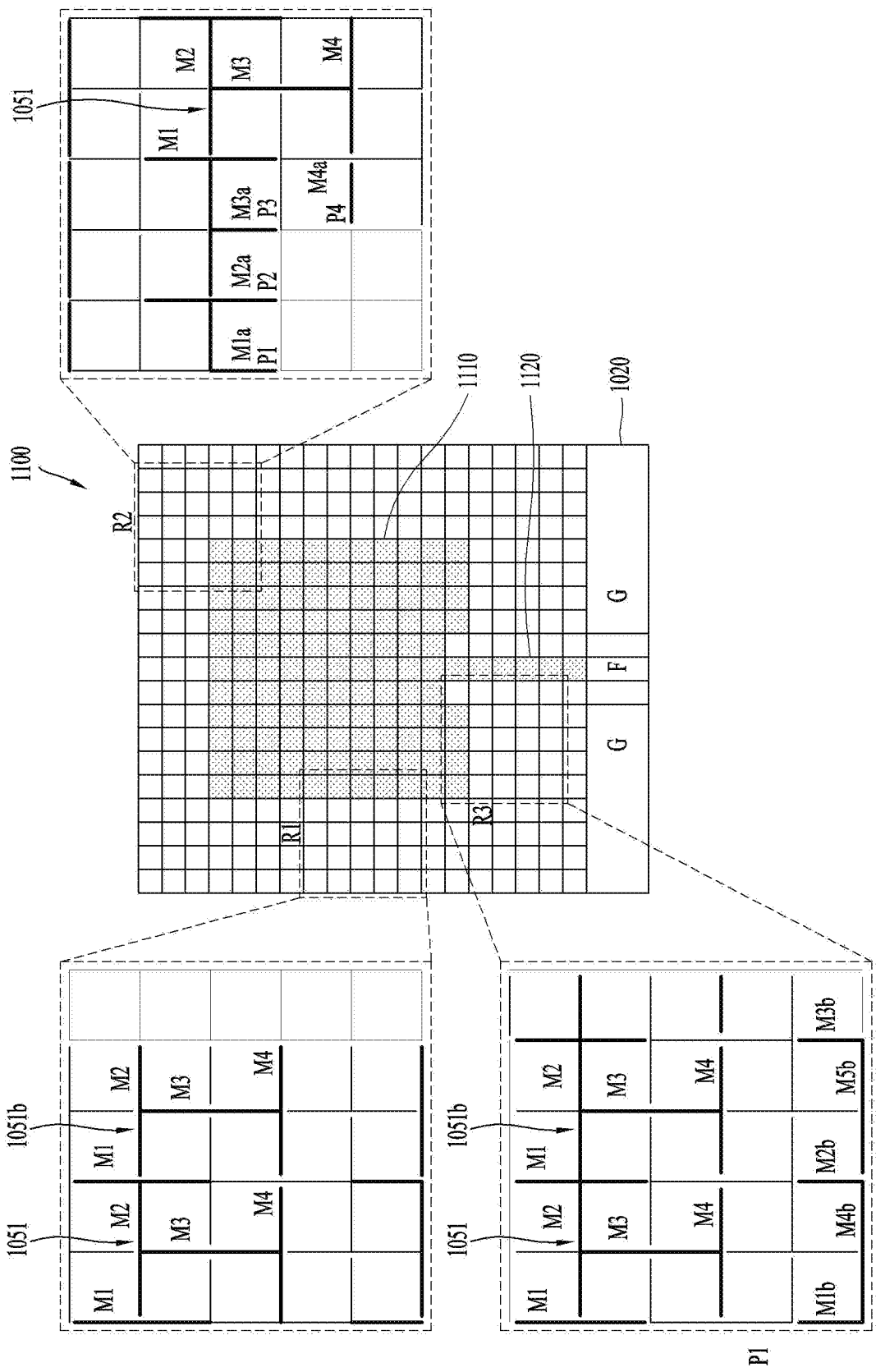
FIG. 15 illustrates a metal mesh grid of an antenna element and a dummy mesh grid in an adjacent dummy region according to the present disclosure for each area.

Referring to FIG. 15, a mesh grid structure may include the unit cell 1051 in a first region R1 spaced apart from a boundary of the antenna element 1110 by a certain distance or more. The first unit cell 1051 may be configured such that the first metal line M1 to the fourth metal line M4 are connected to each other at respective intersection points. As an example, another unit cell 1051b may be disposed adjacent to the unit cell 1051 including the first to fourth metal lines M1 to M4. The unit cell 1051b is configured to have a structure corresponding to the unit cell 1051 and may include the first metal line M1 to the fourth metal line M4, but is not limited thereto. As another example, as shown in FIG. 7A, the second unit cell 1052 including the fifth metal line M5 to the eighth metal line M8 may be disposed in a region adjacent to the unit cell 1051.

Metal lines may be configured to be disconnected from adjacent metal lines at respective intersection points in a second region R2 apart from a boundary of the antenna element 1110 by a certain distance. Metal lines M1a to M4a may be configured to be disconnected from metal lines constituting the boundary of the antenna element 1100 at points P1 to P4 adjacent to the boundary of the antenna element 1100.

A dummy mesh grid structure may be disposed in a third region R3 adjacent to the antenna element 1110 and a feed pattern 1120. A mesh grid structure in the third region R3 may include the unit cell 1051. The unit cell 1051 may be configured such that the first metal line M1 to the fourth metal line M4 are connected to each other at respective intersection points. Another unit cell 1051b may be disposed adjacent to the unit cell 1051. The another unit cell 1051b may be configured to have a structure corresponding to that of the unit cell 1051, but is not limited thereto. Meanwhile, metal lines M1b to M5b may be configured to have a structure different from a unit cell structure in a region adjacent to a region of an FPCB 1020 in which a feed line F is disposed.

With respect to the dummy mesh grid structure of FIG. 15, a mesh grid may be uniformly printed on a whole layer to be disconnected to match a path of a region of the boundary of the antenna element 1110. An external region of the antenna may be designed to operate as a high impedance surface (HIS) by placing the open dummy structure proposed herein in a peripheral region of the antenna element 1110, Accordingly, isolation between adjacent antennas may improve and antenna radiation efficiency may be enhanced.

The first to third regions R1 to R3 shown in FIG. 15 represent an embodiment in which an open dummy structure may be periodically repeated. In relation to this, there may be a portion in which some periodic structures are not properly implemented at the boundary of the antenna element 1110 or a boundary at which the feed line F of the FPCB 1020 is in contact with a ground surface G. However, such a portion does not significantly affect implementation of performance of the HIS in terms of overall structural analysis of the antenna and the open dummy lattice structure.

An antenna module having a structure including a metal mesh grid in an antenna region and a dummy mesh grid in a dummy region, as disclosed herein, is to be described. In relation to this, FIG. 16 illustrates an antenna module having a structure including a metal mesh grid in an antenna region and a dummy mesh grid in a dummy region, as disclosed in the present disclosure.

Figure 16:
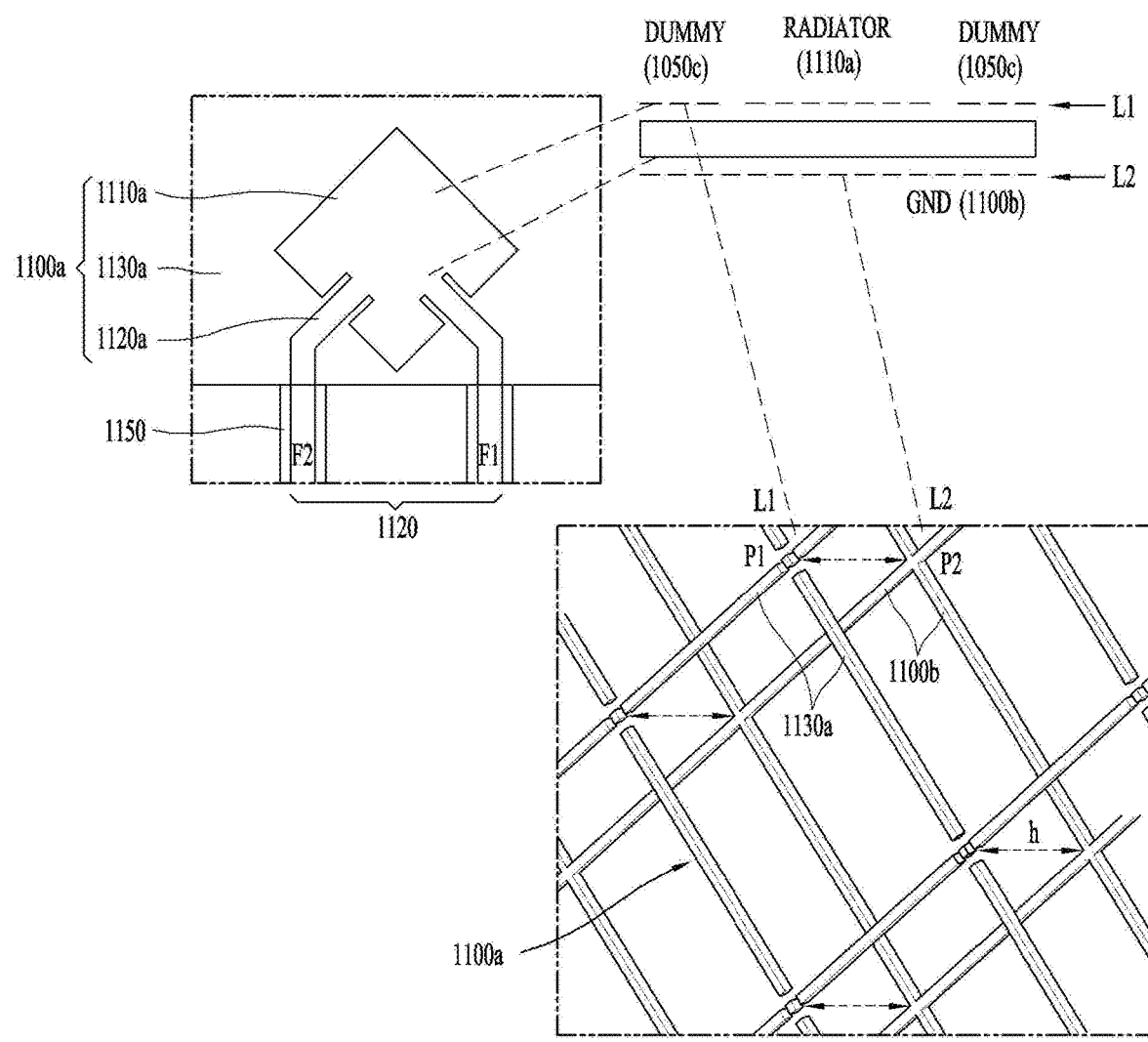
FIG. 16 illustrates an antenna module having a structure including a metal mesh grid in an antenna region and a dummy mesh grid in a dummy region, as disclosed in the present disclosure.

Referring to FIG. 16, the first layer L1 and the second layer L2 may be disposed on a front region and a rear region of the dielectric substrate 1010, respectively. A first metal mesh pattern 1100a of the first layer L1 may include an antenna pattern 1110a, a feed pattern 1120a, and a dummy pattern 1130a. The antenna pattern 1110a may be connected to the feed pattern 1120a, and the feed pattern 1120 may be connected to the feed line 1150 of a CPW transmission line. The feed line 1150 may include first and second feed lines F1 and F2 so that the antenna module is implemented as a dual polarization antenna. Meanwhile, the antenna module may be implemented as a single polarization antenna with single polarization by a single feed line.

Meanwhile, the dummy lattice structure 1050c may be disposed as a dummy pattern on both sides of the antenna pattern 1110a. Additionally, the first metal mesh pattern 1100a may include a feed pattern 1120a and a dummy pattern 1130a. In relation to this, the dummy lattice structures 1050c may be disposed as a dummy pattern on both sides of the feed pattern 1120a. Accordingly, dummy lattice structures 1050c corresponding to dummy patterns may be disconnected from each other at the first point P1 which is a lattice intersection point. The dummy pattern 1130a is not limited thereto, and may be configured to have a structure including the first unit cell 1051 and/or the second unit cell 1052, as shown in FIGS. 7A and 9A. As illustrated in FIGS. 7A and 9A, the first unit cell 1051 may be configured to include the first metal line M1 to the fourth metal line M4. As illustrated in FIGS. 7A and 9A, the second unit cell 1052 may be configured to include the fifth metal line M5 to the eighth metal line M8.

Meanwhile, a second metal mesh pattern 1100b of the second layer L2 corresponding to a rear region of the dielectric substrate 1010 may be configured as a ground pattern. The second metal mesh pattern 1100b corresponding to the ground pattern may be configured to be electrically connected to a ground region corresponding to a signal line region. Second metal mesh pattern 1100b may be interconnected to each other at the second point P2, which is a lattice intersection point. The first point P1 of a floating ground pattern 1130a and the second point P2 of the second metal mesh pattern 1100b may be disposed to correspond to each other.

A mesh cell on an upper surface may be configured to have a shape, a thickness, and a line width in correspondence with those of a mesh cell on a lower surface to improve optical invisibility of a transparent antenna. In relation to this, as illustrated in FIG. 16, lattices of the first and second layers L1 and L2 may be configured to be aligned when viewed from a front. Accordingly, when viewed from a front of a display on which a transparent substrate is placed, the mesh cell on the upper surface may appear to overlap the mesh cell on the lower surface. Accordingly, when a metal pattern is disposed on the first and second layers L1 and L2, optical transmittance of the mesh grid structure is enhanced.

In this regard, referring to FIGS. 6C, 9, and 16, the mesh grid structures of the first layer L1 and the second layer L2 may be disposed to correspond to each other. A shape, a thickness in a height direction, and a line width of the first metal mesh pattern 1130a of the first layer L1 may be configured to correspond to a shape, a thickness in a height direction, and a line width of the second metal mesh pattern 1100b of the second layer L2. In addition, the first point P1 of intersection or disconnection of the first metal mesh pattern 1130a in one axial direction and another axial direction may be configured to correspond to the second point P2 of intersection of the second metal mesh pattern 1100b.

Meanwhile, a distance h between mesh grids of the first and second layers L1 and L2 corresponding to an upper surface and a lower surface, respectively, may be set to correspond to a thickness of the dielectric substrate 1010. In relation to this, when the dielectric substrate 1010 is implemented using an optical adhesive (OCA), the distance h between mesh grids may correspond to a thickness of the OCA. In this case, electrical performance (a bandwidth) and optical performance (moiré, color shift) of an antenna may be adjusted depending on the distance h between the mesh grids.

Meanwhile, an antenna assembly including a dummy region of a dummy mesh grid structure and an antenna region of a metal mesh grid structure according to the present disclosure, i.e., an antenna module may be configured as an array antenna including a plurality of antenna elements. An array antenna needs to be configured to expand communication coverage in a millimeter wave band such as a 60 GHz band. In relation to this, FIG. 17 illustrates a configuration of an array antenna having a dummy region of a dummy mesh grid structure according to the present disclosure.

Figure 17:
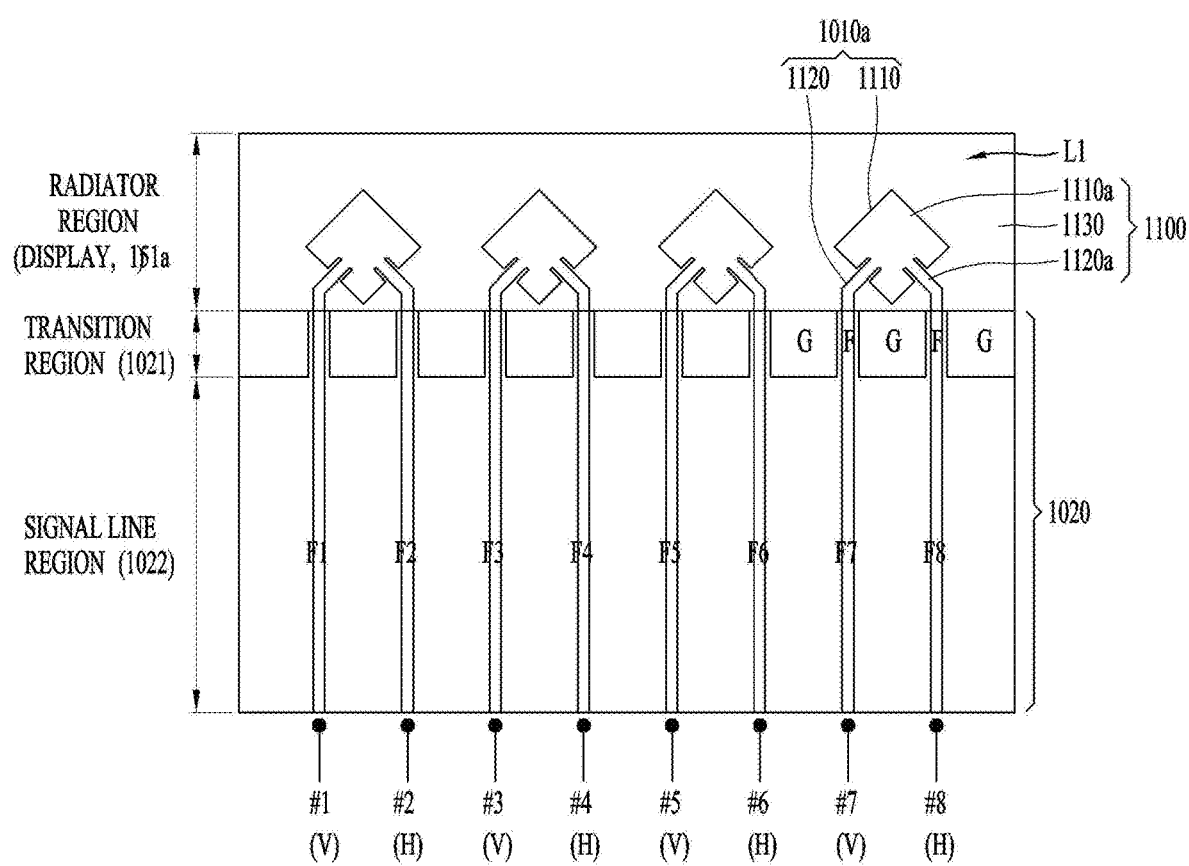
FIG. 17 illustrates a configuration of an array antenna having a dummy region of a dummy mesh grid structure according to the present disclosure.

Referring to FIGS. 16 and 17, the antenna module 1100 may include a first layer L1 including the radiator region 1010a and the dummy region 1030, and the second layer L2 including a ground layer. The antenna module 1100 may further include the flexible printed circuit board (FPCB) 1020. A ground pattern G may be disposed on both sides of a feed line 1120 disposed on one surface of the FPCB 1020 to be spaced apart from the feed line F. In relation to this, the FPCB 1020 may include a transition region 1021 including a CPW transmission line to enable impedance switching between the radiator region 1010a and a signal line region 1022. The FPCB 1020 may further include the signal line region 1022 in which a plurality of feed lines F1 to F8 are disposed. The signal line region 1022 may be configured as a microstrip line as shown in FIG. 17, but is not limited thereto. The signal line region 1022 may include a strip line or a CPW transmission line.

The radiator region 1010a may be configured to include the antenna element 1110 and the feed pattern 1120. The antenna element 1110 may be configured to include a metal mesh grid in which metal lines are interconnected with each other in one axis direction and another axis direction to radiate a wireless signal. The antenna element 1110 may be disposed to rotate at a certain angle as shown in FIG. 17, or disposed in parallel with an end portion of the radiator region 1010a.

The feed pattern 1120 may be configured to include a metal mesh grid in which metal lines are interconnected with each other at least in one axis direction to feed a wireless signal to the antenna element 1110. Referring to FIGS. 9A and 17, first end portions of the first metal line M1 and the fourth metal line M4 in the dummy region 1030 may be configured to be disconnected from end portions of metal lines extending from outer metal lines of the antenna element 1110.

The first metal mesh pattern 1100a constituting each patch antenna element may be configured to include the antenna pattern 1110a, the feed pattern 1120a, and the dummy pattern 1130. Each patch antenna element including the antenna pattern 1110a, the feed pattern 1120a, and the dummy pattern 1130 may be arranged in a horizontal direction to form a 1×4 array antenna. Each patch antenna element may be connected to a feed pattern through which feeding is made in one axial direction and another axial direction to thereby configure a dual polarization antenna. Feed lines 1120 disposed on the transition region 1021 and the signal line region 1022 may be configured to apply a first polarized signal and a second polarized signal to the antenna pattern 1110a. The feed lines 1120 may be alternately arranged so that a vertically polarized signal and a horizontally polarized signal are applied to the antenna pattern 1110a.

Meanwhile, in a configuration of the array antenna according to the present disclosure, the antenna element does not operate only as a dual polarization antenna. In relation to this, as shown in FIG. 10A, each antenna element in an array antenna configuration may operate as a single polarization antenna. In addition, the array antenna configuration according to the present disclosure is not limited to a 1×4 array antenna, and a number of antenna elements may be changed to 2, 4, 6, 8, etc. depending on an application. The array antenna may be configured as a 1×8 array antenna to expand communication coverage in a millimeter wave band such as a 60 GHz band.

Figure 18A:
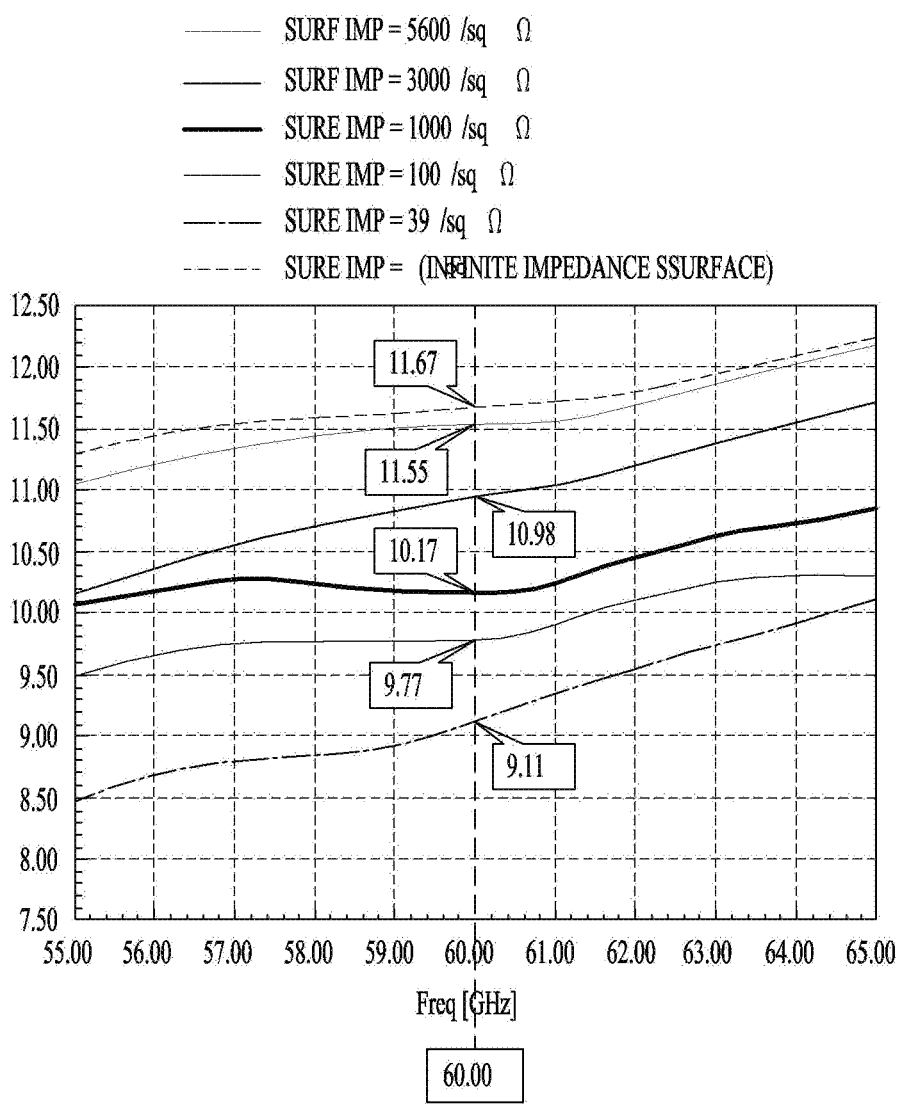
FIG. 18A illustrates an antenna gain of a 1×4 array antenna at each frequency for different surface impedances, the 1×4 array antenna having a dummy lattice structure disposed therein according to the present disclosure.
Figure 18B:
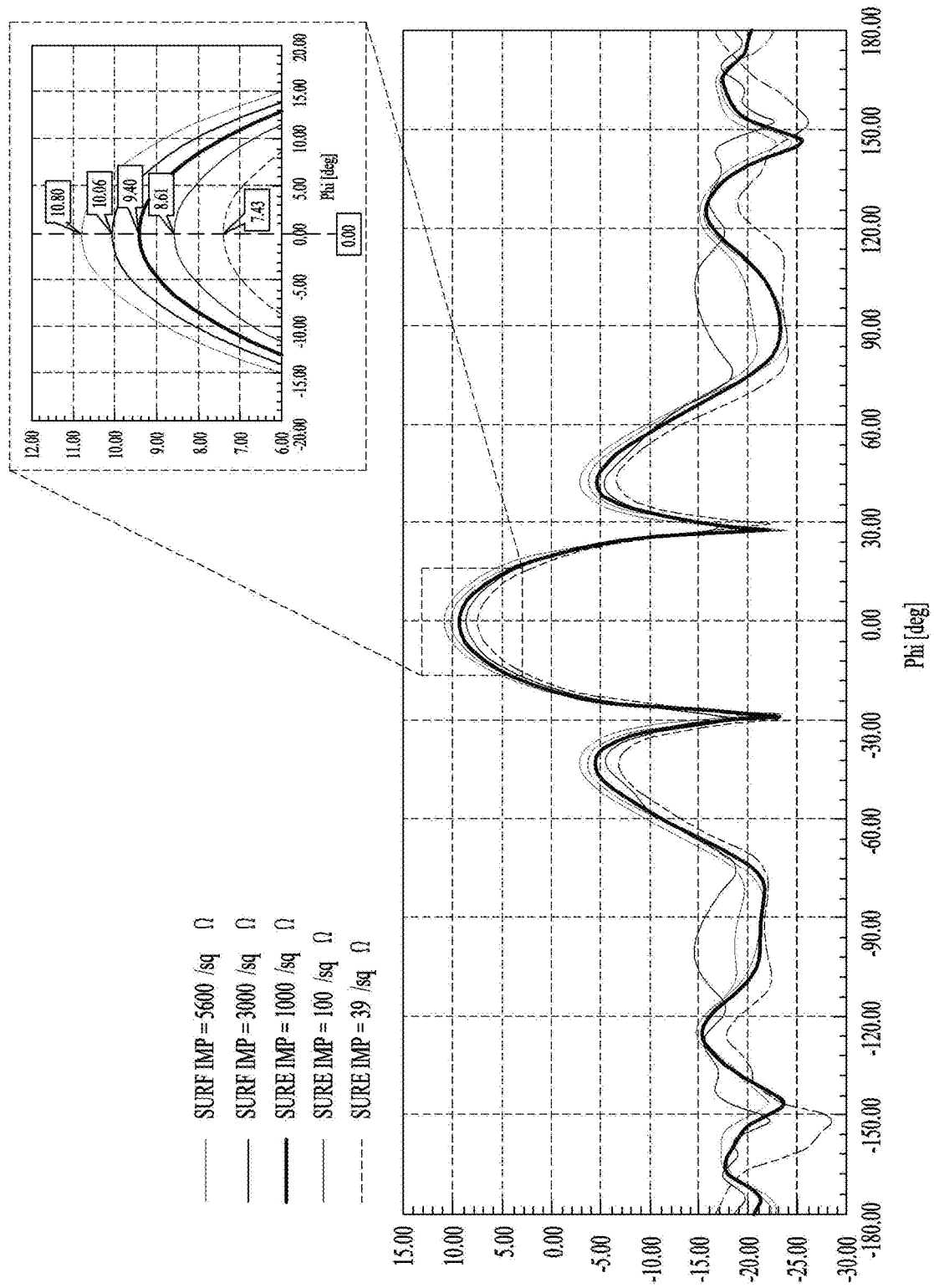
FIG. 18B illustrates a radiation pattern of the 1×4 array antenna for different surface impedances, the 1×4 array antenna having a dummy lattice structure disposed therein according to the present disclosure.

Meanwhile, an array antenna having a dummy lattice structure according to the present disclosure may improve antenna radiation efficiency by reducing side radiation components through the dummy lattice structure. In relation to this, FIG. 18A illustrates an antenna gain of a 1×4 array antenna at each frequency for different surface impedances, the 1×4 array antenna having a dummy lattice structure disposed therein according to the present disclosure. FIG. 18B illustrates a radiation pattern of the 1×4 array antenna for different surface impedances, the 1×4 array antenna having a dummy lattice structure disposed therein according to the present disclosure.

The dummy lattice structure 1050b having disconnected metal lines, as shown FIG. 6B, has a surface impedance of about 39 ohms. Referring to FIGS. 6B and 18A, when a surface impedance is about 39 ohm, a gain of the 1×4 array antenna is about 9.11 dBi at 60 GHz. Meanwhile, as the surface impedance increases to 100, 1000, and 3000 ohm, the gain of the 1×4 array antenna increases to about 9.77, 10.17, and 10.94 dBi, respectively, at 60 GHz. The dummy lattice structure 1050c having a unit cell structure, shown in FIG. 6C, has a surface impedance of about 5600 ohm. Referring to FIGS. 6C and 18A, when a surface impedance is about 5600 ohm, a gain of the 1×4 array antenna is about 11.55 dBi at 60 GHz. The dummy lattice structure 1050c having the unit cell structure according to the present disclosure has a gain increased by about 2.44 dBi compared to the dummy lattice structure 1050b having disconnected metal lines, with reference to the 1×4 array antenna.

In relation to this, in a case of the dummy lattice structure 1050b having disconnected metal lines as shown in FIG. 6B, radiation efficiency of the 1×4 array antenna is about 44%. Meanwhile, in a case of the dummy lattice structure 1050c having the unit cell structure as shown in FIG. 6B, radiation efficiency of the 1×4 array antenna is about 89%. In addition, the dummy lattice structure 1050c having the unit cell structure according to the present disclosure has a value approximate to a gain of 11.67 dBi, i.e., a gain of the 1×4 array antenna on an ideal infinite impedance surface.

FIG. 18B illustrates a change in a two-dimensional (2D) radiation pattern of a 1×4 array antenna according to application of an open dummy having different surface impedances. Referring to FIGS. 6B and 18B, when a surface impedance is about 39 ohm, a gain of the 1×4 array antenna is about 7.43 dBi. Meanwhile, as the surface impedance increases to 100, 1000, and 3000 ohm, the gain of the 1×4 array antenna increases to about 8.61, 9.40, and 10.06 dBi, respectively, at 60 GHz. In relation to this, since a reflection coefficient is taken into consideration, the gain of the 1×4 array antenna of FIG. 18B is lower than the gain of the 1×4 array antenna of FIG. 18A. Meanwhile, the dummy lattice structure 1050c having a unit cell structure, shown in FIG. 6C, has a surface impedance of about 5600 ohm. Referring to FIGS. 6C and 18A, when a surface impedance is about 5600 ohm, a gain of the 1×4 array antenna is about 10.80 dBi at 60 GHz.

Figure 19:
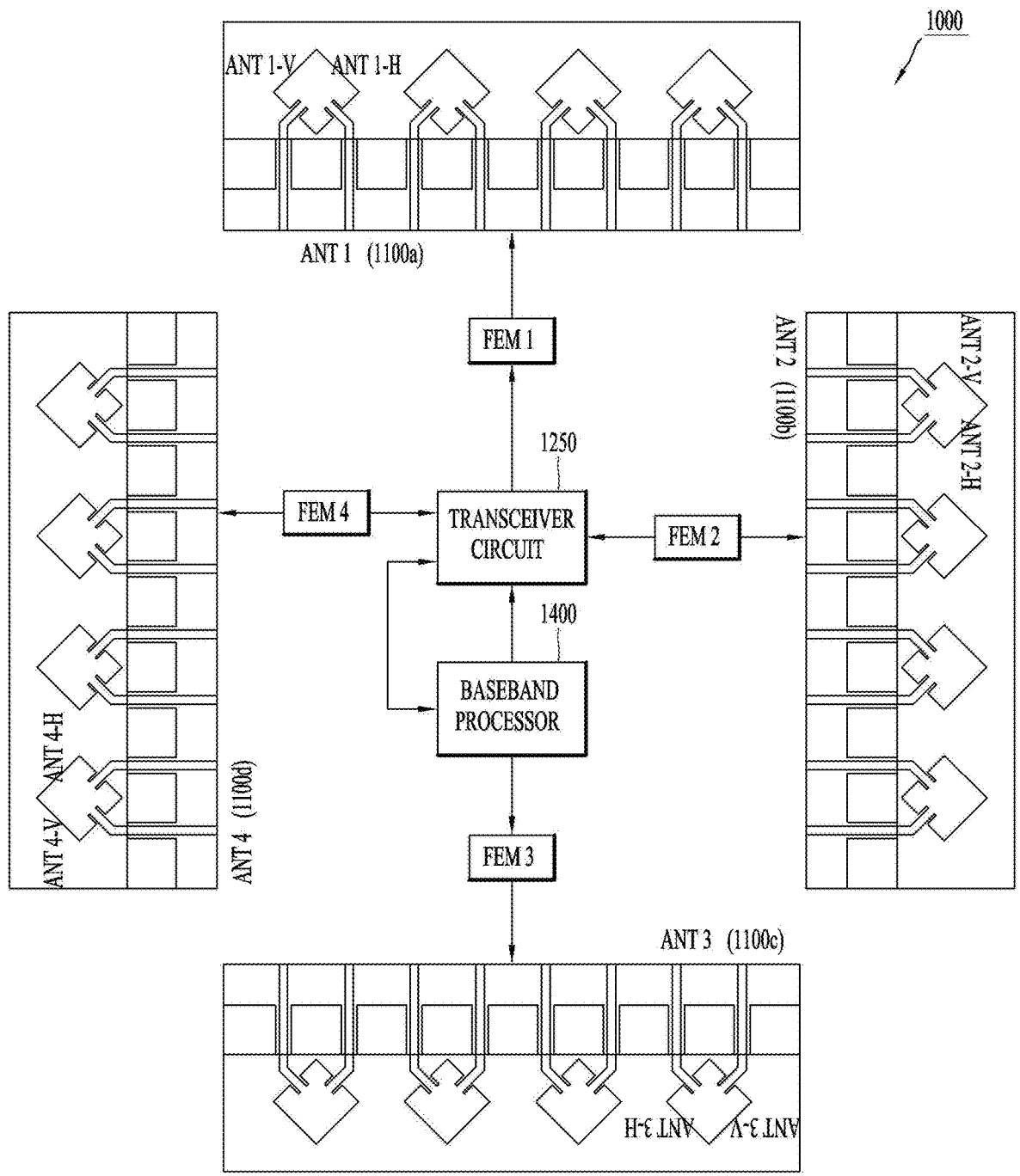
FIG. 19 illustrates an antenna module configured in a dual polarization antenna structure according to one embodiment, and an electronic device including the antenna module.

An array antenna structure having a dummy region in which a dummy mesh grid with the unit cell structure, as disclosed herein, is disposed may include a plurality of array antennas disposed in different positions in an electronic device. In this regard, FIG. 19 illustrates an antenna module configured in a dual polarization antenna structure according to one embodiment, and an electronic device including the antenna module.

Referring to FIGS. 1 to 19, the electronic device may include a display 151 and an antenna module 1100. The display 151 may be configured to display information on a screen. The display 151 may have a metal mesh pattern to radiate wireless signals to an electronic device placed nearby. The antenna module 1100 may be disposed on a lower region of the electronic device. In this regard, a location where the antenna module 1100 is disposed is not limited to this and may change in various ways depending on applications.

Referring to FIG. 10A, the antenna module 1100 may include the dielectric substrate 1010 disposed in a lower region of the display 151. Referring to FIGS. 6A to 7A and 9A to 10B, the antenna module 1100 may include the first layer L1 disposed on a front surface of the dielectric substrate 1010.

The first layer L1 may include the radiator region 1010*a* including the metal mesh grid 1050*a* and the dummy region 1030 including the dummy mesh grid 1050*c* including a plurality of patterns. The antenna module 1100 may further include the second layer L2 disposed on a rear surface of the dielectric substrate 1010 and having the metal mesh grid 1050*a* configured thereon to operate as a ground thereon.

A plurality of patterns of the dummy mesh grid 1050*c* may constitute the first to fourth metal lines M1 to M4. In this regard, the first metal line M1 and the third metal line M3 may be configured as lines parallel to each other. The second metal line M2 may be configured to connect the first metal line M1 to the third metal line M3. The fourth metal line M4 may be configured to be connected to a second end portion of the third metal line M3.

A capacitive component Cf may be constituted between the plurality of patterns of the dummy mesh grid 1050*c* on the first layer L1 and the metal mesh grid 1050*a* on the second layer L2. The metal mesh grid 1050*a* on the second layer L2 may include an inductive component Lg. Therefore, side surface radiation at the first layer L1 may be prevented by the capacitive component Cf between the first and second layers L1 and L2 and the inductive component Lg of the second layer L2. Accordingly, radiation efficiency of the antenna element 1110 may improve and directivity toward a front direction may be enhanced.

Meanwhile, the first and second end portions of the first metal line M1 may be configured to be disconnected from adjacent metal lines. The first end portion of the second metal line M2 may be connected to the first metal line M1, and the second end portion of the second metal line M2 may be disconnected from an adjacent metal line. The first and second end portions of the third metal line M3 may be connected to the second metal line M2 and the fourth metal line M4, respectively. The first and second end portions of the fourth metal line M4 may be configured to be disconnected from an adjacent metal line.

Meanwhile, the plurality of patterns of the dummy mesh grid 1050*c* on the first layer L1 may include the first unit cell 1051 including the first metal line M1 to the fourth metal line M4. In addition, the plurality of patterns of the dummy mesh grid 1050*c* may further include the second unit cell 1052 configured to include the fifth metal line M5 to the eighth metal line M8.

The fifth metal line M5 and the seventh metal line M7 may be configured as lines parallel to each other. The sixth metal line M6 may be configured to connect the fifth metal line M5 to the seventh metal line M7. The eighth metal line M8 may be configured to be connected to a second end portion of the seventh metal line M7.

A detailed configuration of the fifth to eighth metal lines M5 to M8 constituting the second unit cell 1052 is described with reference to disposition of the first unit cell 1051 and adjacent metal lines. The first end portion of the fifth metal line M5 may be disconnected from the fourth metal line M4, and the second end portion of the fifth metal line M5 may be disconnected from an adjacent metal line. The first end portion of the sixth metal line M6 may be connected to the fifth metal line M5, and the second end portion of the sixth metal line M6 may be configured to be disconnected from an adjacent metal line. The first and second end portions of the seventh metal line M7 may be configured to be connected to the sixth metal line M6 and the eighth metal line M8, respectively. The first end portion of the eighth metal line M8 may be disconnected from the third metal line M3, and the second end portion of the eighth metal line M8 may be disconnected from an adjacent metal line.

Meanwhile, the antenna module 1100 that is implemented as an array antenna in the present disclosure may include a plurality of antenna modules 1100*a* to 1100*d* disposed on different regions of the electronic device. In this regard, the electronic device may further include the transceiver circuit 1250 and the processor 1400. In this regard, the transceiver circuit 1250 and the processor 1400 may be disposed on a separate circuit board from the display with the antenna module (ANT) 1100 and the FPCB.

The transceiver circuit 1250 may be electrically connected to the antenna module 1100. The transceiver circuit 1250 may be configured to apply a first signal and a second signal to the antenna pattern 1110*a* through the feed pattern 1120*a* and the second feed pattern 1120*b*.

The processor 1400 may be operably coupled to the transceiver circuit 1250 and may be configured to control the transceiver circuit 1250. The processor 1400 may control the transceiver circuit 1250 to perform MIMO while performing beamforming in different directions through the plurality of antenna modules 1100*a* to 1100*d*.

The processor 1400 may control the transceiver circuit 1250 to perform beamforming while performing multiple input/multiple output (MIMO) as a first signal and a second signal are applied to the plurality of array antennas disposed in a plurality of antenna elements. In this regard, the first signal and the second signal for MIMO may be a first polarized signal and a second polarized signal in an orthogonal state. Meanwhile, the processor may control the transceiver circuit 1250 to perform first beamforming by the first signal and second beamforming by the second signal.

The first antenna module ANT1 to the fourth antenna module ANT4 may be operably coupled to a first front end module FEM1 to a fourth front end module FEM4. In this regard, each of the first front end module FEM1 to the fourth front end module FEM4 may include a phase controller, a power amplifier, and a reception amplifier. Each of the first front end module FEM1 to the fourth front end module FEM4 may include several components of the transceiver circuit 1250.

The processor 1400 may be operably coupled to the first front end module FEM1 to the fourth front end module FEM4. The processor 1400 may include several components of the transceiver circuit 1250 corresponding to the RFIC. The processor 1400 may include a baseband processor 1400 corresponding to a modem. The processor 1400 may be provided in a system on chip (SoC) form to include several components of the transceiver circuit 1250 corresponding to the RFIC and the baseband processor 1400 corresponding to the modem. However, the configuration of FIG. 12 is not limited thereto but may vary differently depending on applications.

The processor 1400 may control the first front end module FEM1 to the fourth front end module FEM4 to radiate signals through at least one of the first antenna module ANT1 to the fourth antenna module ANT4. In this regard, an optimal antenna may be selected based on quality of a signal received through each of the first antenna module ANT1 to the fourth antenna module ANT4.

The processor 1400 may control the first front end module FEM1 to the fourth front end module FEM4 to perform MIMO through two or more of the first antenna module ANT1 to the fourth antenna module ANT4. In this regard, an optimal antenna combination may be selected based on quality and interference level of a signal received through each of the first array antenna ANT1 to the fourth array antenna ANT4.

The processor 1400 may control the first front end module FEM1 to the fourth front end module FEM4 to perform carrier aggregation (CA) through at least one of the first antenna module ANT1 to the fourth antenna module ANT4. In this regard, when each of the first array antenna ANT1 to the fourth array antenna ANT4 dual-resonates at the first band and the second band, the CA may be performed through one array antenna.

The processor 1400 may determine signal qualities at the first band and the second band with respect to each of the antennas. The processor 1400 may perform CA through one antenna at the first band and another antenna at the second band on the basis of signal qualities at the first band and the second band.

The antenna module corresponding to the multi-layered substrate may include various numbers of array antennas. In this regard, the electronic device may include two or more array antennas. The electronic device may include two array antennas and perform beamforming and MIMO using the two array antennas. As another example, the electronic device may include four or more array antennas and perform beamforming and MIMO using some of the four or more array antennas.

The antenna module may include the first array antenna 1100-1 and the second array antenna 1100-2. In this regard, the first array antenna 1100-1 and the second array antenna 1100-2 may operate as different polarized antennas.

The first array antenna (1100*a*) ANT1 may include a first horizontally polarized antenna ANT1-H and a first vertically polarized antenna ANT1-V. The second array antenna (1100*b*) ANT2 may include a second horizontally polarized antenna ANT2-H and a second vertically polarized antenna ANT2-V. On the other hand, the third array antenna (1100*c*) ANT3 may include a third horizontally polarized antenna ANT3-H and a third vertically polarized antenna ANT3-V. The fourth array antenna (1100*d*) ANT4 may include a fourth horizontally polarized antenna ANT4-H and a fourth vertically polarized antenna ANT4-V.

In this regard, the first to fourth horizontally polarized antennas ANT1-H to ANT4-H may be first type array antennas operating as the horizontally polarized antennas, like the dipole antenna 1100. In this regard, the first to fourth vertically polarized antennas ANT1-V to ANT4-V may be second type array antennas operating as the vertically polarized antennas, like the slot antenna 1100*b*.

One antenna module may include therein different antennas having polarizations orthogonal to each other, so as to increase the number of MIMO streams by two times. The electronic device may perform maximum rank 8 MIMO through the first horizontally polarized antenna ANT1-H to the fourth horizontally polarized antenna ANT4-H and the first vertically polarized antenna ANT1-V to the fourth vertically polarized antenna ANT4-V. The electronic device may perform 8Tx UL-MIMO through the first horizontally polarized antenna ANT1-H to the fourth horizontally polarized antenna ANT4-H and the first vertically polarized antenna ANT1-V to the fourth vertically polarized antenna ANT4-V. The electronic device may perform 8Rx DL-MIMO through the first horizontally polarized antenna ANT1-H to the fourth horizontally polarized antenna ANT4-H and the first vertically polarized antenna ANT1-V to the fourth vertically polarized antenna ANT4-V.

Alternatively, one antenna module may include therein different antennas having polarizations orthogonal to each other, to suppress signal quality from being lowered due to rotation of the electronic device. In this regard, the first antenna ANT1 may simultaneously transmit and/or receive signals through the first horizontally polarized antenna ANT1-H and the first vertically polarized antenna ANT1-V. Accordingly, even if signal quality received through any one antenna is lowered due to the rotation of the electronic device, signal reception can be carried out through another antenna. Similarly, the fourth antenna ANT4 may simultaneously transmit and/or receive signals through the fourth horizontally polarized antenna ANT4-H and the fourth vertically polarized antenna ANT4-V. Accordingly, even if signal quality received through any one antenna is lowered due to the rotation of the electronic device, signal reception can be carried out through another antenna.

The processor 1400 may maintain dual connectivity state or perform a MIMO operation with different entities through the horizontally polarized antenna and the vertically polarized antenna. In this regard, the processor 1400 may control the transceiver circuit 1250 to maintain the dual connectivity state with a first entity and a second entity through the first array antenna (1100*a*) ANT1 and the fourth array antenna (1100*d*) ANT4. In this case, the first array antenna (1100*a*) ANT1 and the fourth array antenna (1100*d*) ANT4 may operate as the horizontally polarized antenna and the vertical polarized antenna, respectively. Therefore, the processor 1400 may perform dual connectivity or MIMO through antennas that are disposed at different positions in the antenna module of the electronic device to operate as polarized antennas orthogonal to each other. This can reduce interference between signals transmitted or received through different antennas during dual connectivity or MIMO.

As another example, the processor 1400 may control the transceiver circuit 1250 to maintain the dual connectivity state with a first entity and a second entity through the first array antenna (1100*b*) ANT2 and the fourth array antenna (1100*c*) ANT3, respectively. In this case, the second array antenna (1100*b*) ANT2 and the third array antenna (1100*c*) ANT3 may operate as the vertically polarized antenna and the horizontally polarized antenna, respectively. Therefore, the processor 1400 may perform dual connectivity or MIMO through antennas that are disposed at different positions in the antenna module of the electronic device to operate as polarized antennas orthogonal to each other. This can reduce interference between signals transmitted or received through different antennas during dual connectivity or MIMO.

It will be clearly understood by those skilled in the art that various changes and modifications to the aforementioned embodiments related to the array antenna operating at the mmWave band and the electronic device controlling the same are made without departing from the idea and scope of the present disclosure. Therefore, it should be understood that such various modifications and alternations for the embodiments fall within the scope of the appended claims.

So far, the antenna module disposed in the display to operate in the millimeter wave (mmwave) band and the electronic device controlling the same have been described. Hereinafter, technical effects of the antenna module disposed in the display operating in the millimeter wave (mmwave) band and the electronic device including the configuration for controlling the same will be described.

Hereinafter, technical effects of the antenna module disposed in the display operating in the millimeter wave (mmwave) band and the electronic device including the configuration for controlling the same will be described.

According to an embodiment, generation of surface waves at an antenna operating frequency may be suppressed by placing a dummy lattice structure having a unit cell structure in a dielectric region.

According to an embodiment, an end portion of a metal line in a unit cell structure may be disconnected from an adjacent metal line and a metal mesh line of an antenna element to prevent a decrease in antenna efficiency due to a surface wave.

According to an embodiment, an end portion of a metal line in a unit cell structure is disconnected from an adjacent metal line and a metal mesh line of the antenna element to prevent unwanted radiation due to a surface wave in an antenna configuration disposed on a display.

According to an embodiment, a dummy lattice structure having a unit cell structure may be disposed in a dielectric region between antenna elements to prevent interference between adjacent antenna elements due to a surface wave.

According to an embodiment, antenna performance may be optimized by designing a high impedance surface (HIS) optimized for each frequency band in a millimeter wave band, by adjusting pitch spacing of a dummy lattice structure.

According to an embodiment, radiation efficiency and an antenna gain may be greatly increased by concentrating current on an antenna to which a HIS is applied to completely radiate applied power into air.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art. In relation to the aforementioned disclosure, design and operations of an antenna operating in a mmWave band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An antenna module comprising:
a dielectric substrate;
a first layer arranged on a front surface of the dielectric substrate, and comprising a radiator region having a first metal mesh grid and a dummy region having a dummy mesh grid comprising a plurality of patterns; and
a second layer arranged on a rear surface of the dielectric substrate and configured to allow a second metal mesh grid to operate as a ground,
wherein the plurality of patterns constitute a first metal line to a fourth metal line, the first metal line and the third metal line are lines parallel to each other, the second metal line connects the first metal line to a first end portion of the third metal line, and the fourth metal line is connected to a second end portion of the third metal line, and
side surface radiation at the first layer is prevented by a capacitive component between the plurality of patterns of the dummy mesh grid on the first layer and the second metal mesh grid on the second layer and an inductive component of the second metal mesh grid on the second layer.

2. The antenna module of claim 1, wherein a first end portion and a second end portion of the first metal line is configured to be disconnected from adjacent metal lines,
a first end portion of the second metal line is connected to the first metal line, and a second end portion of the second metal line is disconnected from an adjacent metal line,
the first end portion and the second end portion of the third metal line are connected to the second metal line and the fourth metal line, respectively, and
a first end portion and a second end portion of the fourth metal line are configured to be disconnected from adjacent metal lines.

3. The antenna module of claim 2, wherein the first metal line and the third metal line constitute a first inductive component,
a first capacitive component is constituted between adjacent metal lines at a center point of the second metal line and a center point of the fourth metal line, respectively, and
the second end portion of the second metal line and the second end portion of the fourth metal line respectively constitute a second capacitive component between adjacent metal lines.

4. The antenna module of claim 2, wherein the plurality of patterns comprise a first unit cell comprising the first metal line to the fourth metal line; and
a second unit cell configured to comprise a fifth metal line to an eighth metal line,
wherein the fifth metal line and the seventh metal line are lines parallel to each other, the sixth metal line connects the fifth metal line to the seventh metal line, and the eighth metal line is connected to a first end portion of the seventh metal line.

5. The antenna module of claim 4, wherein a first end portion of the fifth metal line is configured to be disconnected from the fourth metal line, and a second end portion of the fifth metal line is configured to be disconnected from an adjacent metal line, a first end portion of the sixth metal line is connected to the fifth metal line, and a second end portion of the sixth metal line is disconnected from an adjacent metal line, the first end portion and a second end portion of the seventh metal line are connected to the eighth metal line and the sixth metal line, respectively, and a first end portion of the eighth metal line is configured to be disconnected from the third metal line, and a second end portion of the eighth metal line is configured to be disconnected from an adjacent metal line.

6. The antenna module of claim 5, wherein the second end portion of the first metal line is configured to be disconnected from the eighth metal line to constitute a first capacitive component, and the first end portion of the fourth metal line is configured to be disconnected from the seventh metal line to constitute a second capacitive component.

7. The antenna module of claim 5, wherein the fifth metal line and the seventh metal line constitute a first inductive component, a first capacitive component is constituted between adjacent metal lines at a center point of the sixth metal line and a center point of the eighth metal line, and the second end portion of the sixth metal line and the second end portion of the eighth metal line constitute a second capacitive component between adjacent metal lines, respectively.

8. The antenna module of claim 1, wherein the dielectric substrate is configured as a transparent substrate disposed on a surface of or inside a display of an electronic device or on a surface of or inside glass of a vehicle.

9. The antenna module of claim 1, wherein the first metal mesh grid in the radiator region is configured such that metal lines are interconnected to each other so that current is generated through the radiator region via the metal lines and a wireless signal is radiated by the current generated through the radiator region.

10. The antenna module of claim 1, wherein a first unit cell of the dummy mesh grid comprising the plurality of patterns in the dummy region is configured such that a first end portion and a second end portion of the first metal line, a second end portion of the second metal line, and a second end portion of the fourth metal line are disconnected from adjacent metal lines to prevent side surface radiation at the first layer.

11. The antenna module of claim 4, wherein the second unit cell of the dummy mesh grid comprising the plurality of patterns in the dummy region is configured such that a first end portion and a second end portion of the fifth metal line, a second end portion of the sixth metal line, and a second end portion of the eighth metal line are disconnected from adjacent metal lines to prevent side surface radiation at the first layer.

12. The antenna module of claim 4, wherein the second layer is configured such that metal lines constituting a ground mesh grid are interconnected to each other to constitute a second inductive component corresponding to a current path induced in the ground mesh grid, and a third capacitive component is constituted between the dummy mesh grid on the first layer and the ground mesh grid.

13. The antenna module of claim 12, wherein the dummy mesh grid constitutes an open dummy structure in which a metal line is disconnected from an adjacent metal line, and a pitch between the first to eighth metal lines in the open dummy structure is set to be in a range of 60 to 300 um.

14. The antenna module of claim 1, further comprising a flexible printed circuit board (FPCB) coupled to a feed pattern in an antenna region and having a ground pattern disposed on both sides of a feed line located on one surface and spaced apart from the feed line, wherein the radiator region comprises:

an antenna element comprising the first metal mesh grid in which metal lines are interconnected to each other in one axis direction and another axis direction to radiate a wireless signal; and the feed pattern comprising the first metal mesh grid in which metal lines are interconnected to each other at least in one axis direction to feed a wireless signal to the antenna element, wherein a first end portion of the first metal line and a first end portion of the fourth metal line in the dummy region are configured to be disconnected from end portions of metal lines extending from outer metal lines in the antenna element.

15. The antenna module of claim 1, wherein a shape, a thickness in a height direction, and a line width of a first metal mesh pattern on the first layer are configured to correspond to a shape, a thickness in a height direction, and a line width of a second metal mesh pattern on the second layer, and a first point of intersection or disconnection of the first metal mesh pattern in one axial direction and another axial direction is configured to correspond to a second point of intersection of the second metal mesh pattern.

16. An electronic device comprising:

a display configured to output information to a screen and having a metal mesh pattern configured to radiate wireless signals to adjacent electronic devices; and an antenna module disposed in a lower region of the electronic device, wherein the antenna module comprises:

a dielectric substrate disposed in a lower region of the display;

a first layer arranged on a front surface of the dielectric substrate, and comprising a radiator region having a first metal mesh grid and a dummy region having a dummy mesh grid comprising a plurality of patterns; and a second layer arranged on a rear surface of the dielectric substrate and configured to allow a second metal mesh grid to operate as a ground, wherein the plurality of patterns constitute a first metal line to a fourth metal line, the first metal line and the third metal line are lines parallel to each other, the second metal line connects the first metal line to a first end portion of the third metal line, and the fourth metal line is connected to a second end portion of the third metal, and side surface radiation at the first layer is prevented by a capacitive component between the plurality of patterns of the dummy mesh grid on the first layer and the second metal mesh grid on the second layer and an inductive component of the second metal mesh grid of the second layer.

17. The electronic device of claim 16, wherein a first end portion and a second end portion of the first metal line is configured to be disconnected from adjacent metal lines, a first end portion of the second metal line is connected to the first metal line, and a second end portion of the second metal line is disconnected from an adjacent metal line, and the first end portion and the second end portion of the third metal line are connected to the second metal line and the fourth metal line, respectively, and a first end portion and a second end portion of the fourth metal line are disconnected from adjacent metal lines.

18. The electronic device of claim 17, wherein the plurality of patterns comprise a first unit cell comprising the first metal line to the fourth metal line; and
a second unit cell configured to comprise a fifth metal line to an eighth metal line,
wherein the fifth metal line and the seventh metal line are lines parallel to each other, the sixth metal line connects the fifth metal line to the seventh metal line, and the eighth metal line is connected to a first end portion of the seventh metal line.

19. The electronic device of claim 18, wherein a first end portion of the fifth metal line is configured to be disconnected from the fourth metal line, and a second end portion of the fifth metal line is configured to be disconnected from an adjacent metal line,
a first end portion of the sixth metal line is connected to the fifth metal line, and a second end portion of the sixth metal line is disconnected from an adjacent metal line,
a first end portion and a second end portion of the seventh metal line are connected to the eighth metal line and the sixth metal line, respectively, and
a first end portion of the eighth metal line is configured to be disconnected from the third metal line, and a second end portion of the eighth metal line is configured to be disconnected from an adjacent metal line.

20. The electronic device of claim 16, further comprising:
a transceiver circuit electrically connected to the antenna module and configured to apply a first signal and a second signal to an antenna pattern of the radiator region through a first feed pattern and a second feed pattern; and
a processor operably coupled to the transceiver circuit to control the transceiver circuit,
wherein the processor controls the transceiver circuit to perform first beamforming by the first signal and second beamforming by the second signal while performing multiple input/multiple output (MIMO), in response to the first signal and the second signal being applied to array antennas disposed in a plurality of antenna elements of the radiator region.

* * * * *